(12) United States Patent
Raichle et al.

(10) Patent No.: US 8,517,180 B2
(45) Date of Patent: Aug. 27, 2013

(54) PROCESS FOR CHARGING A REACTOR WITH A FIXED CATALYST BED WHICH COMPRISES AT LEAST ANNULAR SHAPED CATALYST BODIES K

(75) Inventors: Andreas Raichle, Ludwigshafen (DE); Holger Borchert, Offstein (DE); Klaus Joachim Mueller-Engel, Stutensee (DE); Hagen Wilmer, Ludwigshafen (DE); Cornelia Dobner, Ludwigshafen (DE); Ulrich Cremer, Mannheim (DE)

(73) Assignee: BASF SE, Ludwigshafen (DE)

( * ) Notice: Subject to any disclaimer, the term of this patent is extended or adjusted under 35 U.S.C. 154(b) by 1178 days.

(21) Appl. No.: 12/138,823

(22) Filed: Jun. 13, 2008

(65) Prior Publication Data

US 2008/0312477 A1    Dec. 18, 2008

Related U.S. Application Data

(60) Provisional application No. 60/944,208, filed on Jun. 15, 2007.

(30) Foreign Application Priority Data

Jun. 15, 2007  (DE) .......................... 10 2007 028 332

(51) Int. Cl.
*B07B 1/46* (2006.01)
(52) U.S. Cl.
USPC .......................................... 209/397; 209/235
(58) Field of Classification Search
USPC ................... 209/2, 235, 397, 400, 401, 680
See application file for complete search history.

(56) References Cited

U.S. PATENT DOCUMENTS

| | | | | |
|---|---|---|---|---|
| 1,667,194 A * | 4/1928 | Craig et al. | .................. | 209/397 |
| 2,355,050 A * | 8/1944 | Borton | ............. | 241/91 |
| 3,365,059 A * | 1/1968 | Hobbs | ............. | 209/266 |
| 4,203,906 A | 5/1980 | Takada et al. | | |
| 4,256,783 A | 3/1981 | Takada et al. | | |
| 4,473,466 A * | 9/1984 | Schmidt et al. | ............. | 209/397 |
| 4,737,269 A * | 4/1988 | Bischoff | ............. | 209/23 |
| 5,082,552 A * | 1/1992 | Welch et al. | ............. | 208/216 R |
| 5,739,391 A | 4/1998 | Ruppel et al. | | |
| 5,821,390 A | 10/1998 | Ruppel et al. | | |
| 7,147,011 B2 | 12/2006 | Tazawa et al. | | |
| 7,268,254 B2 | 9/2007 | Olbert et al. | | |
| 7,410,622 B2 | 8/2008 | Olbert et al. | | |
| 2004/0225138 A1 | 11/2004 | McAllister et al. | | |
| 2005/0158217 A1 | 7/2005 | Olbert et al. | | |
| 2005/0161373 A1* | 7/2005 | Tazawa et al. | ............. | 209/400 |
| 2007/0299278 A1 | 12/2007 | Hechler et al. | | |
| 2008/0119673 A1 | 5/2008 | Hechler et al. | | |

FOREIGN PATENT DOCUMENTS

| | | |
|---|---|---|
| DE | 28 30 765 A1 | 1/1980 |
| DE | 29 03 582 A1 | 8/1980 |
| DE | 44 31 949 A1 | 3/1995 |
| DE | 100 31 347 A1 | 1/2001 |

(Continued)

OTHER PUBLICATIONS

U.S. Appl. No. 12/634,149, filed Dec. 9, 2009, Raichle, et al.

*Primary Examiner* — Joseph C Rodriguez
(74) *Attorney, Agent, or Firm* — Oblon, Spivak, McClelland, Maier & Neustadt, L.L.P.

(57) ABSTRACT

A process for charging a reactor with a fixed catalyst bed which comprises at least one annular shaped support catalyst body K, in which, before the charging, fragments formed in the preparation of the shaped catalyst bodies K are removed by screening.

21 Claims, 17 Drawing Sheets

(56) References Cited

FOREIGN PATENT DOCUMENTS

| | | |
|---|---|---|
| DE | 103 61 515 A1 | 7/2005 |
| DE | 10 2004 017 150 A1 | 10/2005 |
| DE | 10 2004 017 151 A1 | 10/2005 |
| DE | 10 2006 017 623 A1 | 10/2007 |
| DE | 10 2006 029 790 A1 | 1/2008 |
| EP | 0 700 714 A1 | 3/1996 |
| EP | 1 726 358 A1 | 11/2006 |

* cited by examiner

PROCESS FOR CHARGING A REACTOR WITH A FIXED CATALYST BED WHICH COMPRISES AT LEAST ANNULAR SHAPED CATALYST BODIES K

Figure 1:
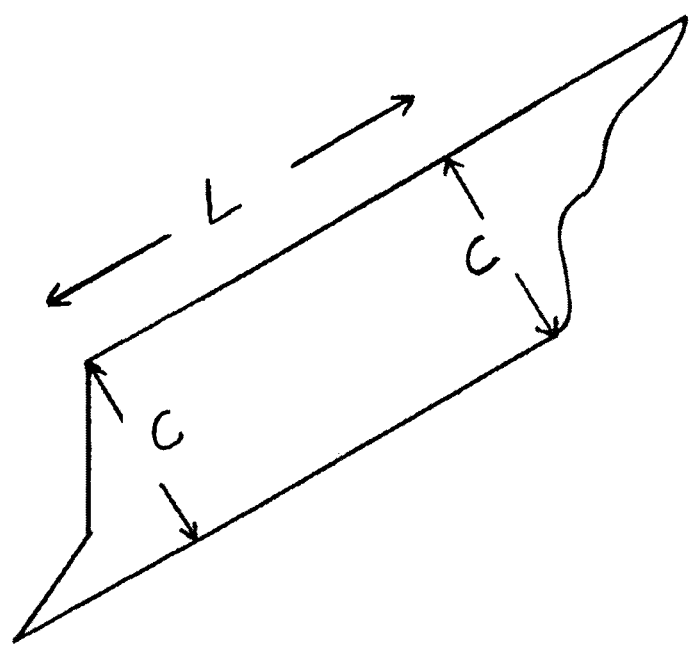
FIG. 1 general form of screen orifice
FIG. 2 screen orifice parameters of two undersized inserts
FIG. 3 screen orifice (elongated hole)
FIG. 4 screen orifice in a parallelogram
FIG. 5 prior art, a screen fabric
FIG. 6 exemplary depiction of a grid or grill
FIG. 7 mutually offset screen orifice
FIG. 8 overlapping screen orifice
FIGS. 9 and 10 screen orifice arrangement in straight line
FIG. 11 fishbone-like screen orifice
FIG. 12 zig-zag configuration of PVC hose
FIG. 13 a schematic of an undamaged annular shaped catalyst body
FIGS. 14 and 15 schematic of fracture lines which occur therein with elevated frequency in the preparation of the annular shaped catalyst bodies
FIG. 16 schematic of a screen orifice from the top
FIG. 17 section of an undersized screen insert (from the top)
FIG. 18 section of an oversized screen insert (from the top)
FIG. 19 section of an undersized screen insert (top view)
FIG. 20 section of an oversized screen
FIG. 21 undersized screen insert (top view)
FIG. 22 section of an oversized screen insert
FIG. 23 undersigned screen insert (prior art)
FIG. 24 section of a screen
FIG. 25 section of an oversized screen insert (prior art)

The present invention relates to a process for charging a reactor with a fixed catalyst bed which comprises at least one shaped catalyst body K whose geometric shape is that of a ring with the external diameter E, the internal diameter I and the height H where E≧H, in which, before the charging, fragments formed in the preparation of the shaped catalyst bodies K are removed at least partly as material which passes through the screen from a screen residue comprising shaped catalyst bodies K by a process for screening, and then the screen residue is used to charge the fixed catalyst bed and the process for screening is performed with the aid of a screen which has screen orifices whose continuous outline has in each case at least two straight-line sections which are opposite one another at a distance C over at least one length L like two parallel sides of a rectangle with the side lengths L and C, with the proviso that each line which runs through an outline point P lying on the outline of a screen orifice and parallel to the theoretical rectangle side with the side length C does not have any further point lying on the outline whose distance from the outline point P>C.

Processes for performing heterogeneously catalyzed gas phase reactions in a fixed catalyst bed disposed in a reactor are just as well known as reactors suitable therefor. In principle, the reactors are generally indirect heat exchangers. In these, a dividing wall separates the reaction chamber from the heat transfer chamber. In the reaction chamber is normally disposed the fixed catalyst bed through which the reaction gas mixture is conducted. During the residence time of the reactants on the catalyst surface, the reactants are converted. A fluid heat exchange medium is typically conducted through the heat transfer chamber, which has the task of supplying the heat of reaction required through the dividing wall (for example in the case of endothermic heterogeneously catalyzed gas phase reactions) or of removing the heat of reaction released in the reaction (for example in the case of exothermic heterogeneously catalyzed gas phase reactions). Useful fluid heat exchange media include both gases and liquids. Examples of such reactors are tube bundle reactors (cf., for example, DE-A 4 431 949, DE-A 2 903 582, EP-A 700 714, DE-C 2 830 765) and thermoplate reactors (cf., for example, DE-A 102 004 017 151, DE-A 102 004 017 150, DE-A 10 361 515) or reactors with heat exchanger plates according to DE-A 10 031 347.

In the tube bundle reactors, the fixed catalyst bed is generally disposed in the reaction tubes and the heat exchange medium is conducted within the space surrounding the reaction tubes. In the thermoplate reactors, the heat exchange medium is conducted through specially designed thermoplates and the fixed catalyst bed is disposed in the reaction chambers bordered by the thermoplates.

It will be appreciated that heterogeneously catalyzed gas phase reactions can, though, also in principle be performed in reactors thermally insulated from their external environment ("adiabatic reactors") (cf., for example, DE-A 10 2006 029 790 and DE-A 10 2006 017 623).

Quite generally, in heterogeneously catalyzed gas phase reactions, attempts are made to minimize the energy demand required to convey the reaction gas. As a measure for achieving this objective, preference is given to using annular shaped catalyst bodies to configure the fixed catalyst bed, since they cause a particularly low pressure drop in the passage of the reaction gas through the fixed catalyst bed (cf., for example, WO 2005/03039). A further advantage of annular shaped catalyst bodies normally consists in reduced diffusion pathways and, resulting from this in many cases, in an improved target product yield.

However, a disadvantage of annular catalysts is that they have a comparatively elevated fracture sensitivity. In the course of their preparation, there is therefore normally always a certain degree of formation of fractured shaped catalyst bodies (of fractured or crushed catalyst rings), which is why the annular shaped catalyst bodies are generally prepared in a mixture with fragments of such shaped catalyst bodies (or are obtained as such a mixture). Specifically, such fragments may have a wide variety of different geometries and particle sizes (degrees of fineness). When a fixed catalyst bed is obtained by using mixtures just mentioned, what accrue are fixed catalyst beds in which the cavities which normally form in the bed in the case of sole use of intact annular shaped catalyst bodies may be filled (blocked) with such fragments.

Such fixed catalyst beds having an elevated packing density, though, naturally cause an elevated pressure drop when they are flowed through by reaction gas.

U.S. Pat. No. 7,147,011 recommends, as a remedy for the problem described above, a process for charging a reactor with a fixed catalyst bed which comprises annular shaped catalyst bodies, in which, before the charging, fragments formed in the preparation of the annular shaped catalyst bodies are removed completely as material which passes through the screen from the screen residue formed from the annular shaped catalyst bodies by a process for screening, and only thereafter is the screen residue used to charge the fixed catalyst bed.

U.S. Pat. No. 7,147,011 recommends, in the case of annular shaped catalyst bodies with an external diameter E and a length (height) H, where E>H, the use of screens whose orifices have a length L and a mesh width C which satisfy the relations E>C>H and L≧C, but U.S. Pat. No. 7,147,011 leaves open what the terms "mesh width C" and "length L" should be in the case of a screen orifice of any desired shape.

Instead, U.S. Pat. No. 7,147,011 states merely that C and L are the side lengths of the rectangle in the case of rectangular screen orifices.

A disadvantage of the procedure recommended in U.S. Pat. No. 7,147,011 is, however, that what remains as the screen residue (also referred to as "oversize") is essentially only undamaged annular shaped catalyst bodies, while the material which passes through the screen (also known as "undersize") comprises not only fine fragment particles but also comparatively coarse fragment particles, and possibly undamaged catalyst rings. In other words, the objective of U.S. Pat. No. 7,147,011 is the removal of all catalyst fragments.

As a result, the proportion by mass which is accounted for by material which passes through the screen in the procedure recommended in U.S. Pat. No. 7,147,011 is comparatively large, which is disadvantageous against the background of falling raw material resources and rising raw material costs, since the material which passes through the screen normally has to be disposed of or reprocessed in a comparatively complicated manner. This is all the more true against the background that comparatively coarse catalyst fragments contribute to the increase in pressure drop described only to a comparatively small degree, while finely divided catalyst fragments contribute to this in a greater than proportional degree. The correctness of the above becomes particularly apparent when it is taken into account that the fixed catalyst bed, in the multitude of all cases, consists not only of catalytically active shaped bodies but generally of mixtures which comprise both catalytically active shaped bodies and inert shaped diluent bodies. "Inert" means here generally that, when the reaction gas mixture is conducted under the reaction conditions through a charge consisting only of shaped diluent bodies in the reactor (i.e. by a corresponding fixed bed consisting only of shaped inert bodies), the conversion of the reactants, based on single pass of the reaction gas through the fixed bed, is $\leq 5$ mol %, usually $\leq 2$ mol %. Such inert shaped diluent bodies additionally typically have an elevated fracture resistance and can normally be obtained commercially free of fragments.

The problem addressed by the present invention was therefore that of providing a process for charging a reactor with a fixed catalyst bed which comprises at least shaped catalyst bodies K whose geometric shape is that of a ring with the external diameter E, the internal diameter I and the length (height) H with the proviso that E>H, in which, before the charging, primarily the finely divided fragments (down to catalyst dust) are removed as material passing through the screen from a screen residue comprising shaped catalyst bodies K by a process for screening, and then the screen residue is used to charge the fixed catalyst bed.

As a solution to this problem, the present invention provides a process for charging a reactor with a fixed catalyst bed which comprises at least one shaped catalyst body K whose geometric shape is that of a ring with the external diameter E, the internal diameter I and the height H where $E \geq H$, in which, before the charging, (catalyst) fragments (for example (catalyst) fragments formed in the thermal treatment of annular green bodies in the preparation of annular multielement unsupported catalysts K) formed in the preparation of the shaped catalyst bodies K are removed at least partly as material which passes through the screen from a screen residue comprising shaped catalyst bodies K by a process for screening, and then the screen residue is used to charge the fixed catalyst bed and the process for screening is performed with the aid of a screen which has screen orifices whose continuous outline has in each case at least two straight-line sections which are opposite one another at a distance C over at least one length L like two parallel sides of a rectangle with the side lengths L and C, with the proviso that each line which runs through an outline point P lying on the outline of a screen orifice and parallel to the theoretical rectangle side with the side length C does not have any further point lying on the outline whose distance from the outline point P>C (is greater than C), wherein, in the process for screening, the relations I, $$L>E\geq H>C\geq(E-I)/2 \qquad (I),$$

are satisfied.

Preferably in accordance with the invention, in the process according to the invention, the relations II, $$L>E\geq H>C\geq H/2\geq(E-I)/2 \qquad (II),$$

are satisfied.

Even more preferably in accordance with the invention, in the process according to the invention, the relations III, $$L>E\geq H>0.9H\geq C\geq H/2\geq(E-I)/2 \qquad (III),$$

are satisfied.

Even better, in the process according to the invention, the relations IV, $$L>E\geq H>0.9H>C>H/2\geq(E-I)/2 \qquad (IV),$$

are satisfied.

Very particularly favorably in accordance with the invention, in the process according to the invention, the relations V, $$L>E\geq H>0.86H\geq C>H/2\geq(E-I)/2 \qquad (V),$$

are satisfied.

Of course, the process according to the invention is also present when one of the following relations is satisfied:

$$L>E\geq H>0.9H\geq C\geq(E-I)/2; \qquad (VI)$$

or $$L>E\geq H>0.9H>C\geq(E-I)/2; \qquad (VII)$$

or $$L>E\geq H>0.86H\geq C\geq(E-I)/2; \qquad (VIII)$$

or $$L>E\geq H>0.86H>C\geq(E-I)/2. \qquad (IX)$$

Very particularly advantageously, L, both in the relations I and in the case of the relations II, III, IV and V and VI, VII, VIII and IX is $\geq 1.5E$, better $\geq 2E$ and even better $\geq 2.5E$.

In general, in the process according to the invention, both in the relations I and in the case of the relations II, III, IV and V and VI, VII, VIII and IX, however, L is $\leq 20E$, in many cases $L \leq 15E$, frequently $L \leq 10E$ and often $L \leq 5E$. This length restriction is, however, caused more by secondary features, for example an excellent mechanical stability of the screen, than by the desired screening action.

A comparatively general form of a possible inventive screen orifice (or outline thereof is shown by way of example by FIG. 1.

Figure 2:
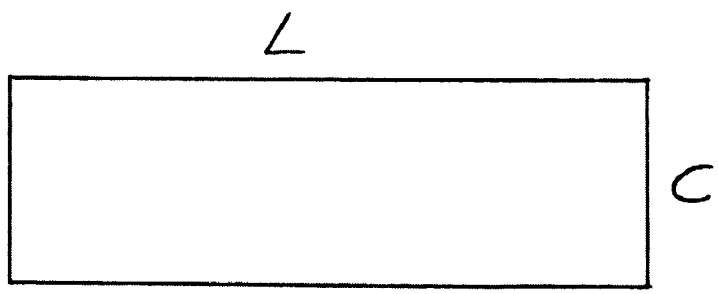

In the simplest case, an inventive screen orifice (or outline thereof may be a rectangle with the side lengths L and C, as shown by way of example by FIG. 2.

Figure 3:
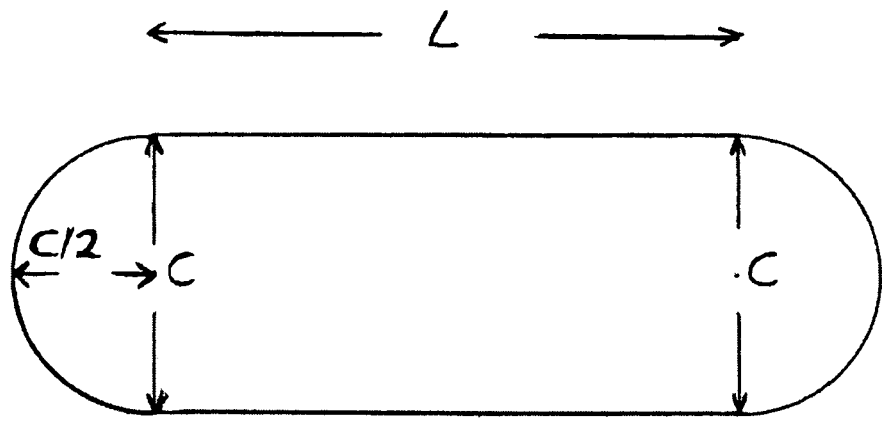
Figure 4:
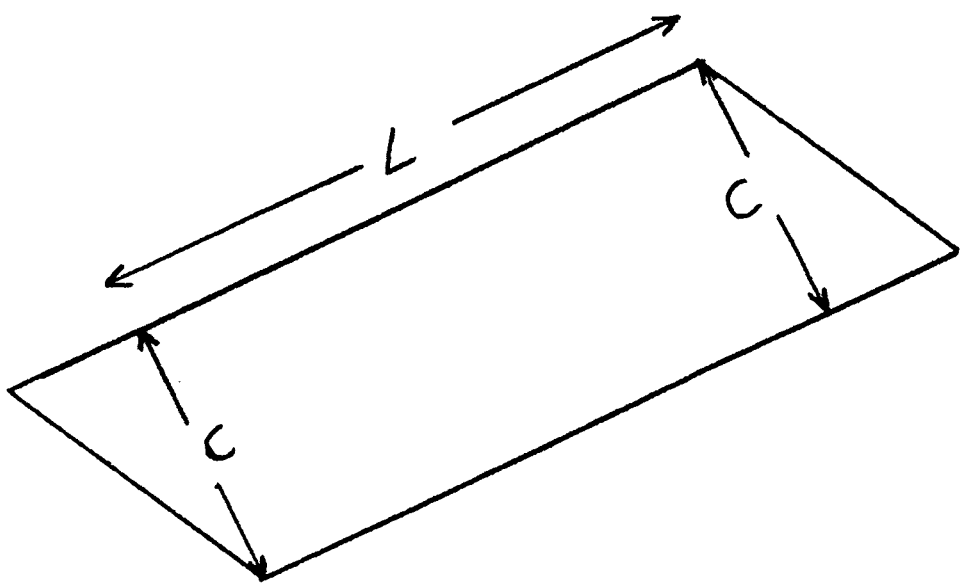

Of course, an inventive screen orifice (or outline thereof may also be an elongated hole, as shown by way of example by FIG. 3. The geometry of an elongated hole with the edge length L derives from that of a rectangle with the side lengths L and C by replacing the sides with the length C in each case by a semicircle with the diameter C (the hole width), the semicircle curve pointing away from the rectangular area. Of course, another possible inventive screen orifice (or outline thereof (both expressions are used equivalently in this document)) is a parallelogram, as shown by way of example by FIG. 4. In addition, another possible outline of an inventive screen orifice is one which derives from a rectangular outline by virtue of all or at least some of the corners of the rectangle having been rounded off.

In principle, a screen to be used in accordance with the invention may have, for example, a plurality of different types of screen orifices possible in accordance with the invention. Advantageously in accordance with the invention, a screen used in a process according to the invention will, however, have not more than three and generally not more than two different types of screen orifices which satisfy the inventive profile of requirements. Very particularly advantageously, however, a screen to be used in accordance with the invention will have only one type of inventive screen orifices.

Preferably in accordance with the invention, the screen orifices (or outline thereof) of a screen to be used in accordance with the invention are either only one inventive type of rectangles or only one inventive type of elongated holes (each of which satisfies one of the relations I, or preferably II, III, IV or V or VI, VII, VIII or IX).

The term "screen" is used in this document synonymously with the term "screen plate". Otherwise, the term "screen" or "screen plate" is used in this document in the sense of the definition given in EP-A 1 726 358 in column 5 lines 48 to 57.

In other words, the screen plate may, for example, be configured as a grid or grille, as a perforated or slotted sheet (i.e. as a sheet with punched, lasered, water-cut or milled screen orifices) or as a screen fabric (it consists of wires woven together, and the wires may be round or profiled). In principle, for the process according to the invention, useful screen plate variants are also any other screen plate variant detailed in Aufbereitungs-Technik-No. 11/1960, p. 457 to 473 or in Chem.-Ing.-Techn. 56 (1984) No. 12, page 897 to 907. It will be appreciated that it is also possible to use, for the process according to the invention, all screen plates detailed in "Sieben und Siebmaschinen, Wiley-VCH GmbH & Co. KGaA, Paul Schmidt et al (2003)" for the process according to the invention.

Figure 5:
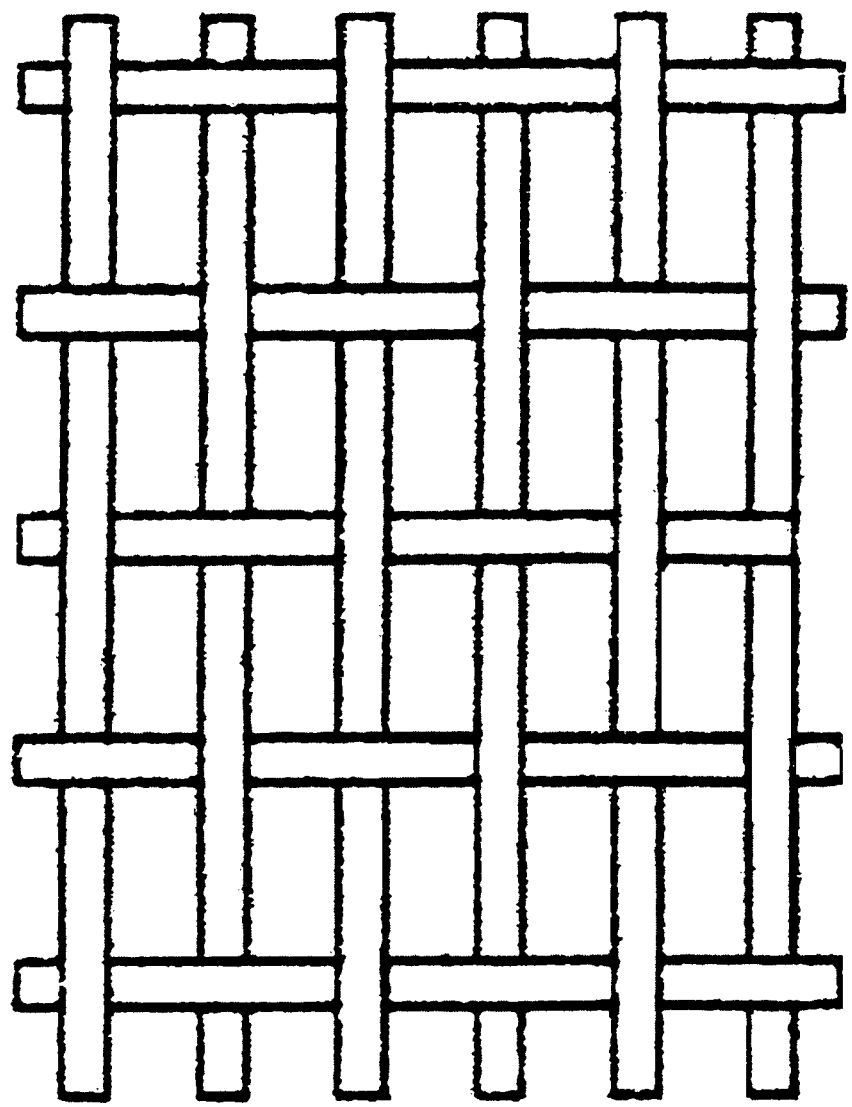

Grids or grilles and screen fabrics (both ensure particularly high specific screen outputs in $kg/m^{3 \cdot h}$ at high efficacy) are suitable especially in the case of screen plates having only one inventive type of rectangular screen orifice. An exemplary illustrative depiction of such a screen fabric is shown by FIG. 5 of this document.

Figure 6:
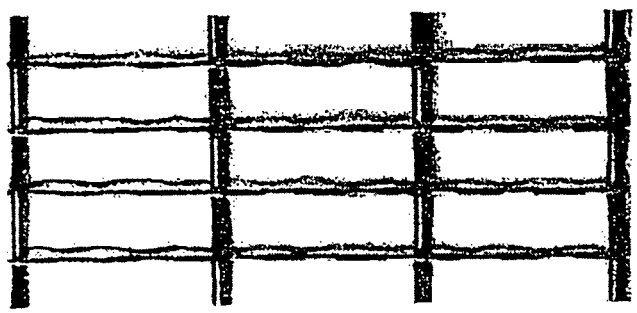

An exemplary illustrative depiction of such a grid or grille is shown by FIG. 6 of this document.

Any inventive screen orifices (or outlines of screen orifices) can be realized in a simple manner in perforated or slotted sheets. However, perforated or slotted sheets advantageous in accordance with the invention are especially those which have only one type of rectangular screen orifice (or outline thereof) or a screen orifice (or outline thereof) having an elongated hole shape.

Figure 9:
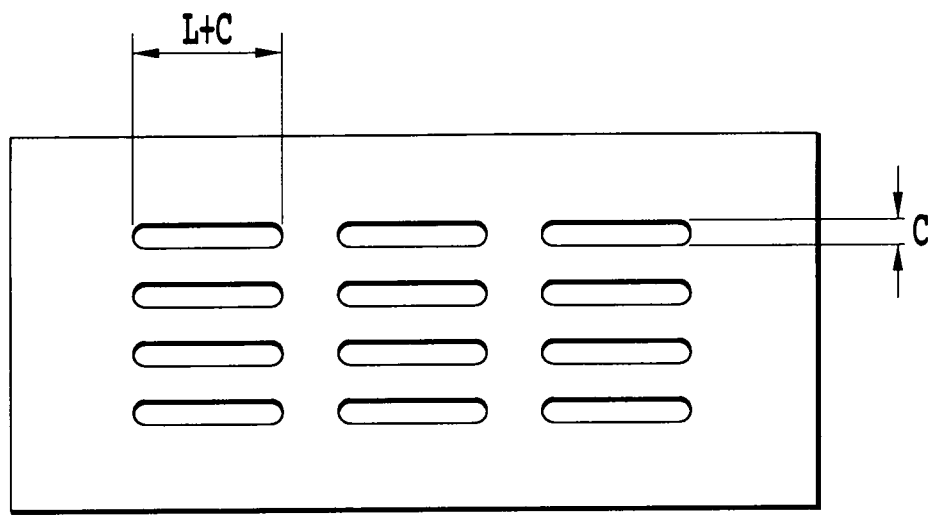
Figure 10:
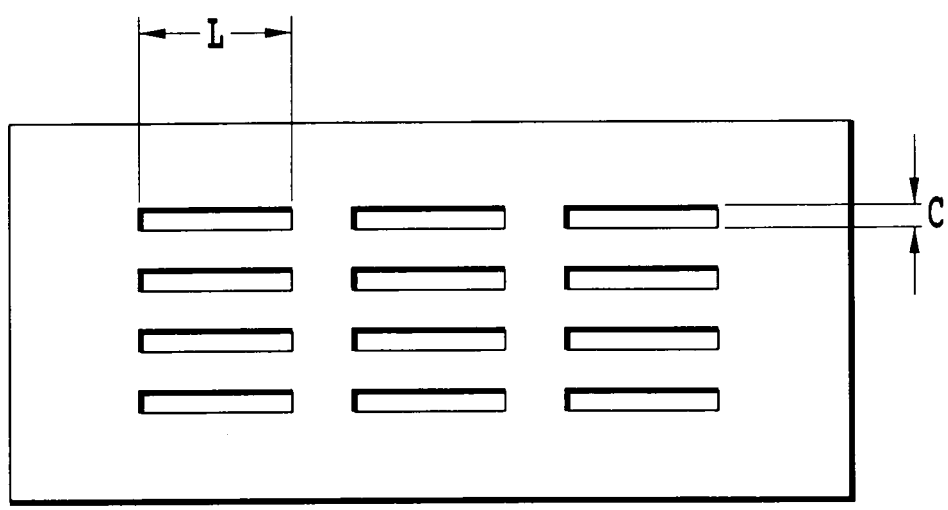
Figure 11:
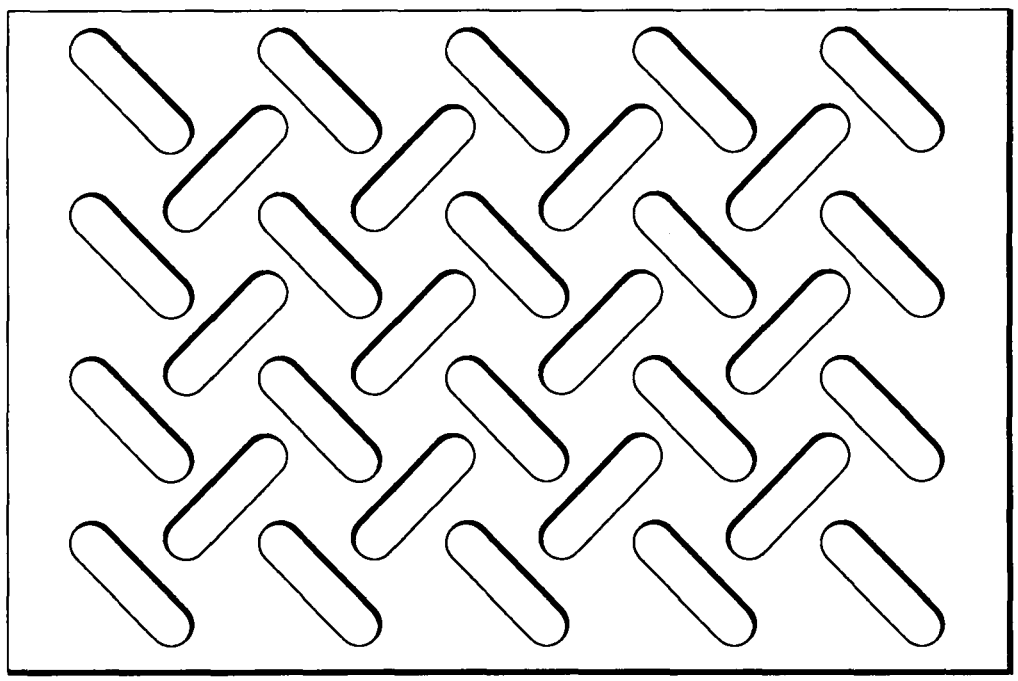

What is particularly advantageous about perforated or slotted sheets is that the relative arrangement of inventive screen orifices is possible in virtually any manner. When the slotted sheet has only one type of rectangular screen orifice or a screen orifice having an elongated hole shape useful relative arrangements thereof in the slotted sheet for the process according to the invention are especially the mutually offset screen orifice arrangement according to FIG. 7, the overlapping offset screen orifice arrangement according to FIG. 8 (which is very particularly preferred in accordance with the invention (for reasons of stability among others)), the screen orifice arrangement in straight lines according to FIGS. 9 and 10, or fishbone-like screen orifice arrangements according to FIG. 11. A reason for a further advantage of slotted sheets is that they can be cleaned more easily in the case of product switches and are less prone to blockage of the screen orifices by stuck particles. They also generally have a higher mechanical stability.

Otherwise, perforated sheet screens (and slotted sheet screens) suitable in accordance with the invention can be configured as described in DIN 24041.

Typical sheet thicknesses d of perforated sheet screens (or slotted sheet screens) usable in accordance with the invention are from 1 to 5 mm, preferably from 1 to 3 mm, more preferably from 1 to 2 mm.

The open screen area F (the total (cross-sectional) area of all screen orifices present in a slotted sheet screen plate) of slotted sheet screen plates favorable in accordance with the invention will, based on the total area of the slotted sheet screen plate, typically be from 10 to 60%, preferably from 20 to 50% and more preferably from 30 to 50%.

Figure 7:
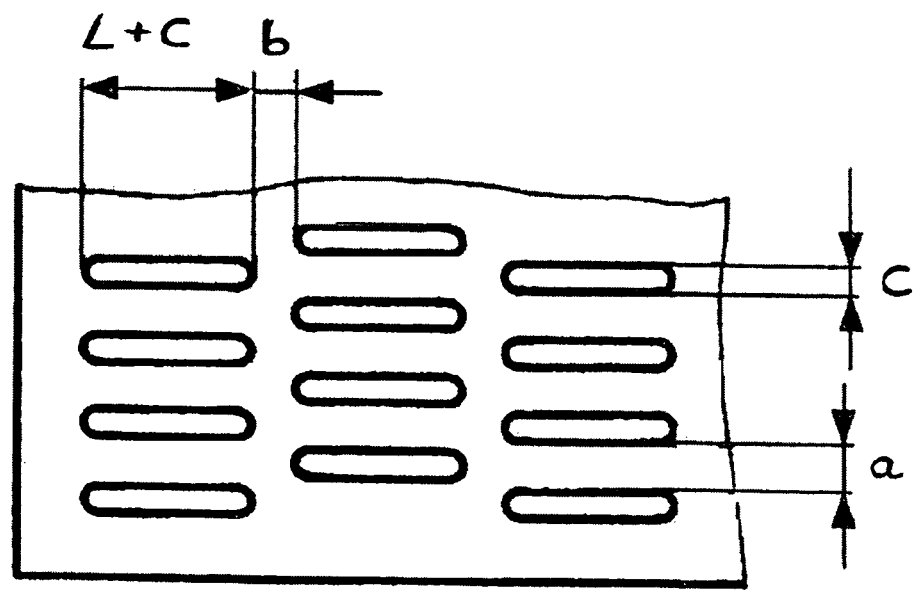

A sheet with elongated holes suitable in accordance with the invention (a screen plate with elongated holes suitable in accordance with the invention) with mutually offset elongated holes according to FIG. 7 may, for example, have the following configuration variants:

| Hole width C (mm) | Length L (mm) | Distance a (mm) | Distance b (mm) | d (mm) | F (%) |
|---|---|---|---|---|---|
| 1.0 | 19 | 3.0 | 5.0 | 1.5 | 19.8 |
| 1.6 | 18.4 | 2.4 | 5.0 | 1.0 | 31.4 |
| 2.0 | 18 | 10 | 4.5 | 1.25 | 13.3 |
| 2.5 | 17.5 | 3.5 | 5.0 | 1.0 | 32.4 |
| 4.0 | 6.0 | 7.0 | 4.0 | 2.0 | 23.7 |
| 5.0 | 20.0 | 4.0 | 5.0 | 2.0 | 45 |
| 5.0 | 15.0 | 3.0 | 5.0 | 2.0 | 47 |
| 5.0 | 15.0 | 4.0 | 5.0 | 2.0 | 42 |
| 8.0 | 17.0 | 8.0 | 11 | 2.0 | 32 |
| 10.0 | 22.0 | 6.0 | 8.0 | 2.0 | 47 |

Useful materials are especially steel (for example DIN materials 1.4541 or 1.4571 and S185 steel (DIN material 1.0035) according to DIN EN 10025 or DIN EN 10088-1).

Figure 8:
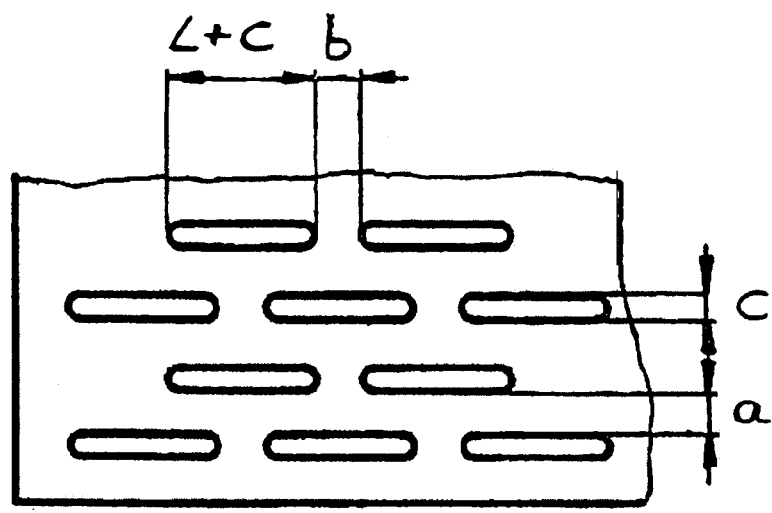

A screen with elongated holes suitable in accordance with the invention with overlapping offset elongated holes according to FIG. 8 may, for example, have the following configuration variants:

| Hole width C (mm) | Length L (mm) | Distance a (mm) | Distance b (mm) | d (mm) | F (%) |
|---|---|---|---|---|---|
| 1.0 | 9 | 2.0 | 4.0 | 1 | 24 |
| 2.0 | 10.5 | 3.0 | 5.5 | 1 | 27 |
| 2.0 | 18.0 | 3.0 | 5.0 | 1 | 31 |
| 4.0 | 18.0 | 3.0 | 5.0 | 1 | 44 |
| 8.0 | 17.0 | 8.0 | 11 | 1 | 32 |

A useful material is especially steel (for example DIN materials 1.4541 or 1.4571).

In the case of annular shaped catalyst bodies K of geometry $E \times I \times H = 5$ mm$\times 2$ mm$\times 3$ mm, suitable screens for a process according to the invention are, for example, especially screens with elongated holes of the above-described type (especially with an overlapping offset screen orifice arrangement) where C=1.8 mm and L=18.2 mm, or where C=2.5 mm and L=17.5 mm.

In the case of annular shaped catalyst bodies K of geometry E×I×H=7 mm×3 mm×6.9 mm, suitable screens for a process according to the invention are, for example, especially screens with elongated holes of the above-described type (especially with an overlapping offset screen orifice arrangement) where C=6 mm and L=14 mm or where C=4 mm and L=16 mm, or where C=6.2 mm and L=17.8 mm.

In the case of annular shaped catalyst bodies of geometry E×I×H=6.6 mm×3.7 mm×4.2 mm, suitable screens for a process according to the invention are especially screen fabrics according to FIG. 5 where C=3.5 mm and L=20 mm. The wire thickness used to manufacture the screen fabric is advantageously 1 mm. The material used is preferably steel. Suitable materials are especially DIN materials 1.4541 and 1.4571. It will be appreciated that it is also possible in this case to use one of the aforementioned screens with elongated holes where, for example, C=2.5 mm and L=17.5 mm.

The performance of a process according to the invention for charging a reactor with a fixed catalyst bed, the material being screened, which consists of shaped catalyst bodies K and of (catalyst) fragments, is transported through the inventive screen plate, advantageously in accordance with the invention parallel to the length L of the inventive screen orifices. In a corresponding manner, the material being screened is also applied to the screen (to the screen plate) with this direction of application.

When the screen plate used in accordance with the invention is a perforated sheet with punched screen orifices, the punched burr is generally removed and the outline of the screen orifices is, appropriately from an application point of view, rounded off. Over the screen plate thickness, the cross section of a screen orifice is normally essentially constant (i.e. the orifice generally has a constant passage cross section). When the punched burr is not removed, it normally points in the direction of the screen passage.

In principle, the material being screened can be transported through the screen in the process according to the invention through a circular, elliptical and/or linear vibrating motion of the screen plate. For this purpose, for a process according to the invention, it is possible in principle to use all screening machines recommended, for example, in Chem.-Ing.-Tech. 56 (1984) No. 12, p. 897 to 907, and also in Sieben und Siebmaschinen, Grundlagen und Anwendung [Screens and Screening Machines, Fundamentals and Use], Wiley VCH, Paul Schmidt (2003).

The group of screening machines best suited to the performance of a process according to the invention is that of the planar screens in which the material being screened slides as a mat of material being screened in a linear or circular motion on the screen (the screen plate). The intrinsic weight and the friction against the screen cause shearing of the matt of material being screened. What is advantageous is the very low backmixing, which usually has an adverse effect.

The vibrating motion of the screen surface in the case of planar screens is effected in their screen plane. The vibrating motion may have a linear (to and fro) or circular profile (in the first case, reference is made to a linear planar vibrating screen). In the former case, it can proceed in conveying direction or transverse to it. Asymmetric acceleration in the case of linear vibrating motion in conveying direction, even in the case of a horizontal screen, can bring about longitudinal transport of the material being screened.

The circular vibration offers the advantage of constantly maintaining optimal acceleration. It will be appreciated that it is also possible to employ a combination of linear and circular vibrators in the process according to the invention.

In circular vibrators, the horizontal circulating motion is frequently generated through a geared motor. In linear vibrators, the whole screen frame (in which the screen plate is normally quite generally mounted) is set into a linear vibration by contrarotatory unbalanced masses. Linear vibrators may be employed either with a horizontal or tilted screen plate. In the case of a tilted screen plate, the material being screened, by virtue of appropriate tilting of the plane of vibration relative to the screen plate, in accordance with a parabolic trajectory, is thrown upward and simultaneously forward. The angles of inclination may, for example, be from −3° to 25°. From 3° to 4° are preferred in accordance with the invention. Particular preference is given in accordance with the invention to, for example, linear vibration screens from Rhewurm GmbH in Remscheid, Germany.

Rectangular screening machines are preferred over round screens for an inventive planar screen operation. In the case of these, rectangular screen plates are introduced into a likewise rectangular screen frame. As a result of the series arrangement of mutually different screen plates (having different screen orifices) in the transport direction of the material being screened, a fractionation can be brought about in a passage.

For example, the inventive screening, in which the screen residue (the oversize) is the desired screen product, in the form of an appropriate rectangular screen plate, can be followed directly by a further screening in which any shaped bodies present in the screen residue formed in accordance with the invention whose size exceeds the annular shaped catalyst bodies are removed as screen residue from the desired material which then passes through the screen as the screening product.

Instead of a series arrangement of the screen plates, it is also possible to employ an arrangement of screen plates one on top of another for the process according to the invention. In this case, those shaped bodies whose size exceeds the annular shaped catalyst bodies will normally be removed as screen residue by the uppermost screen. The fragments to be removed in accordance with the invention will, in contrast, be passed through from the top downward.

In other words, the inventive screening is effected with the aid of the lower screens. In the case of an arrangement of screen plates one on top of another, preference is given to using round screens. The vibrating motion is preferably configured such that the screen residue is in each case carried to the periphery of the round screen and discharged there.

Figure 12:
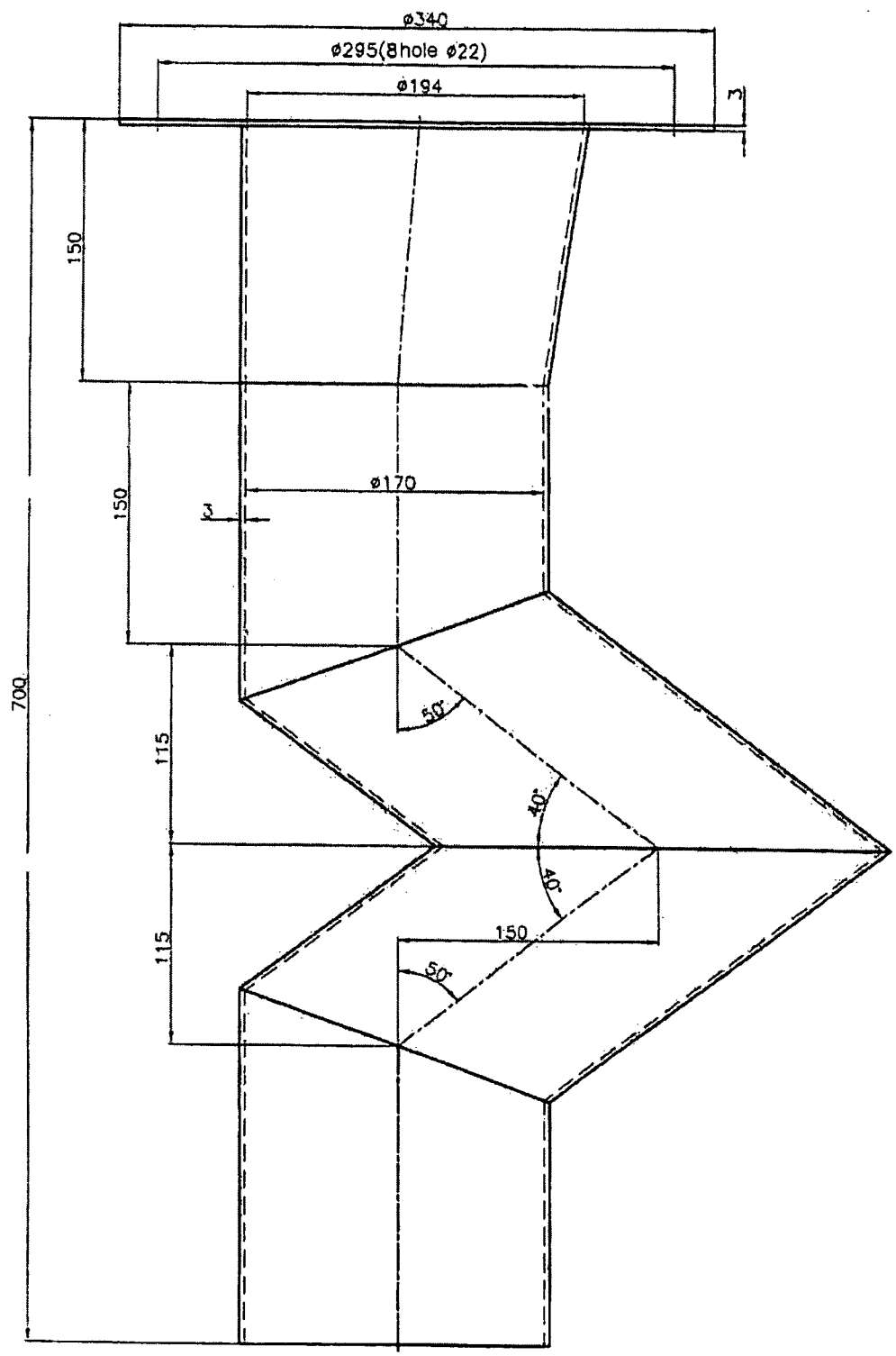

In order to keep the screen orifices clear in the course of an inventive screening, especially when the screen plate is manufactured from steel with a comparatively low modulus of elasticity, the method of rubber ball knocking is used advantageously in accordance with the invention (cf. FIG. 12 in Chem.-Ing.-Tech. 56 (1984) No. 12, page 902). In this method, rubber balls whose diameter D is at least 2 C, preferably at least 3 C, more preferably at least 4 C or 5 C (normally, the rubber ball diameter will not exceed 15 C, usually even 10 C), is placed onto a blank tray which is at a distance Z of typically from about 1.2 D to 1.5 D below the screen (the screen plate). Even in the case of planar screening machines, the rubber balls jump during the screening operation (during the screening) from below against the screen and clean the screen locally. Their elasticity is such that they essentially do not cause any additional fracture of the material being screened. The blank tray is usually a perforated sheet with preferably square hole orifices whose edge length is typically at least A, frequently at least 1.5 A, but normally not more than 0.8 D, usually not more than $\tfrac{2}{3}$ D. In each case, the hole orifices of the blank tray are such that the material which passes through the screen can pass through them. Appropriately from an application point of view, screen plates (as the "top plane") and blank plates (as the "base plane") can be configured with identical total cross-sectional area, and be supplemented by four side walls of height Z to give a cuboidal screen insert which, in a simple manner, can be inserted into the screen frame (the frame height exceeds the screen insert inserted generally by about 10 cm) of the screening machine. For example, such a cuboidal screen insert, in its base plane, may typically have a length of 500 mm (it preferably runs parallel to the side length L of the elongated holes of a screen with elongated holes, for example the screen with elongated holes cited by way of example in this document) and a width of 250 mm. The separation Z of base plane and top plane may, for example, be from 15 to 30 mm. When it is 25 mm, the diameter of the rubber balls is advantageously 20 mm. Appropriately, from an application point of view, such an insert generally comprises about 20 rubber balls. Alternatively to rubber ball knocking, screen cleaning during the screening operation can also be brought about continuously by flat or roller brushes arranged above and/or below the screen plate. The above-described screening variants can also be found in Schüttgut Vol. 9 (2003) No. 4, p. 272/273. The freely vibrating screening machines recommended in this document are particularly advantageous in accordance with the invention. In the selection of the width of vibration (stroke) and the speed (frequency), a high frequency and a short stroke have been found to be useful for the process according to the invention.

The process according to the invention is suitable, among other cases, in the case of annular shaped catalyst bodies K whose active composition is at least one multielement oxide (frequently a multimetal oxide) which comprises
a) the elements Mo, Fe and Bi, or
b) the elements Mo and V, or
c) the element V and additionally P and/or Ti,
and also in the case of shaped catalyst bodies K which comprise, as an active composition, elemental silver on an oxidic support body (all aforementioned annular shaped catalyst bodies K shall also be referred to in this document as annular shaped catalyst bodies K*).

The aforementioned catalysts are suitable especially for heterogeneously catalyzed partial gas phase oxidations in a fixed catalyst bed, in particular in the case of their performance in a tube bundle reactor.

In this document, a full oxidation of an organic compound with molecular oxygen is understood to mean that the organic compound is converted under the reactive action of molecular oxygen such that all of the carbon present in the organic compound is converted to oxides of carbon and all of the hydrogen present in the organic compound is converted to oxides of hydrogen. All different exothermic conversions of an organic compound under the reactive action of molecular oxygen are summarized here as partial oxidations of an organic compound.

In particular, in this document, partial oxidations shall be understood to mean those exothermic conversions of organic compounds under the reactive action of molecular oxygen in which the organic compounds to be oxidized partially, after the conversion has ended, comprises at least one oxygen atom more in chemically bound form than before the partial oxidation was performed.

Examples of such heterogeneously catalyzed partial oxidations of organic compounds include the conversion of methanol to formaldehyde (cf., for example, CH-A 449600, CH-A 38828), the conversion of propene to acrolein and/or acrylic acid (cf., for example, DE-A 23 51 151), the conversion of tert-butanol, isobutene, isobutane, isobutyraldehyde or the methyl ether of tert-butanol to methacrolein and/or methacrylic acid (cf., for example, DE-A 25 26 238, EP-A 092 097, EP-A 058 927, DE-A 41 32 263, DE-A 41 32 684 and DE-A 40 22 212), the conversion of acrolein to acrylic acid, the conversion of methacrolein to methacrylic acid (cf., for example, DE-A 25 26 238), the conversion of o-xylene or naphthalene to phthalic anhydride (cf., for example, EP-A 522 871) and the conversion of butadiene to maleic anhydride (cf., for example DE-A 21 06 796 and DE-A 16 24 921), the conversion of $C_4$ hydrocarbons (especially 1-butene, 2-butene, butadiene and/or n-butane) to maleic anhydride (cf., for example, GB-A 1 464 198 and GB-A 1 291 354), the conversion of indanes to anthraquinones (cf., for example, DE-A 20 25 430), the conversion of ethylene to ethylene oxide (cf., for example, EP-A 352 849, EP-A 352 850, EP-A 532 325, U.S. Pat. No. 5,155,242 and U.S. Pat. No. 5,262, 551) or of propylene to propylene oxide (cf., for example, DE-B 12 54 137, DE-A 21 59 346, EP-A 372 972, WO 89/07101, DE-A 43 11 608), the conversion of propylene and/or acrolein to acrylonitrile (cf., for example, DE-A 23 51 151), the conversion of isobutene and/or methacrolein to methacrylonitrile (i.e., in this document, the term "partial oxidation" shall also comprise partially ammoxidation, i.e. a partial oxidation in the presence of ammonia), the oxidative dehydrogenation of hydrocarbons (cf., for example, DE-A 23 51 151), the conversion of propane to acrylonitrile or to acrolein and/or acrylic acid (cf., for example, DE-A 101 31 297, EP-A 1 090 684, EP-A 608 838, DE-A 100 46 672, EP-A 529 853, WO 01/96270 and DE-A 100 28 582), etc.

In the simplest case, the annular shaped catalyst body K may consist only of catalytically active composition which may, if appropriate, be diluted with inert material (which may be incorporated, for example, for strengthening reasons) (if appropriate, shaping assistant is also present; e.g. graphite). Such annular geometric shaped catalyst bodies are typically referred to as annular unsupported catalysts. For such annular shaped catalyst bodies K, the process according to the invention is of increased significance.

In the case of annular unsupported catalysts, depending on the active composition, the shaping can be effected by compacting catalytically active powder composition (for example a pulverulent multielement oxide active composition) to the annular catalyst geometry, for example (depending on the active composition) by tableting, sintering or extruding. It is possible to add shaping assistants. Alternatively, depending on the desired active composition, it is possible to compact a pulverulent precursor composition to the annular catalyst geometry and to convert the resulting annular shaped bodies by thermal treatment (if appropriate in an atmosphere comprising molecular oxygen) to the catalytically active multi-element oxide shaped bodies (cf., for example, US 2005/0263926 and WO 2005/030393, and also EP-A 1 243 331).

It will be appreciated that the shaping can also be effected by coating an annular geometric shaped body composed of catalytically inactive material (of inert material) with active composition (also referred to hereinafter as annular "shaped support body" or "shaped support body" for short). Alternatively, it is also possible to coat with precursor composition and to effect the conversion to the active annular catalyst by subsequent thermal treatment (if appropriate in an atmosphere comprising molecular oxygen). The coating can be effected in the simplest manner, for example, by moistening the surface of an inert annular support body by means of a liquid binder and then adhering pulverulent active composition or pulverulent precursor composition on the moistened surface. The annular catalysts obtainable in this way are referred to as annular coated catalysts. Suitable inert annular shaped bodies for many heterogeneously catalyzed partial gas phase oxidations consist of porous or nonporous aluminum oxide, silicone oxide, thorium dioxide, zirconium oxide, silicon carbide or silicates such as magnesium silicate or aluminum silicate (for example C 220 steatite from Ceram Tec), but also of metals, for example stainless steel or aluminum (cf., for example, US 2006/0205978).

Instead of coating the inert annular support bodies with pulverulent active composition or with pulverulent precursor composition, the annular support bodies can in many cases also be impregnated with a solution (a molecular and/or colloidal solution) of the catalytically active substance or with a solution of a precursor substance, and then the solvent can be volatilized, which can be followed if appropriate by chemical reduction and/or thermal treatment (if appropriate in an atmosphere comprising molecular oxygen). The annular shaped catalyst bodies K which result in this way are typically referred to as impregnated catalysts.

Irrespective of the preparation route employed in the individual case for annular shaped catalyst bodies K, the annular shaped catalyst bodies K are always obtained to a certain degree in a mixture with crushed annular shaped catalyst bodies K, which suggests employing the process according to the invention.

The external diameter E of annular shaped catalyst bodies K to be used in accordance with the invention will generally be from 2 to 10 mm, frequently from 4 to 8 mm and often from 5 to 7 mm.

The length (height) H of annular shaped catalyst bodies K to be used in accordance with the invention may likewise be from 2 to 10 mm, frequently from 4 to 8 mm, or from 5 to 7 mm.

According to the invention, the H/E ratio must necessarily be $\leq 1$. In very many cases, H/E is from 0.3 to 1, usually from 0.5 to 1 and often from 0.6 to 1.

The wall thickness ((E−I)/2) of inventive shaped catalyst bodies K is appropriately generally from 1 to 3 mm, usually from 1 to 2 mm, often even from 1.5 to 2 mm or from 1 to 1.5 mm.

In addition, it is favorable for annular shaped catalyst bodies K when the I/E ratio is from 0.3 to 0.7, preferably from 0.4 to 0.6.

In other words, the processes according to the invention can be employed in particular in the case of annular shaped catalyst bodies K where E=from 2 to 10 mm, H/E=from 0.03 to 1 and I/E=from 0.3 to 0.7.

All of the aforementioned is especially true when the annular shaped catalyst bodies K are annular shaped catalyst bodies K*.

Annular shaped catalyst bodies K* comprise, inter alia, those annular shaped catalyst bodies K whose active composition is a multielement oxide of the general formula I

(I)

where
X$^1$=nickel and/or cobalt,
X$^2$=thallium, an alkali metal and/or an alkaline earth metal,
X$^3$=zinc, phosphorus, arsenic, boron, antimony, tin, cerium, lead, vanadium, chromium and/or tungsten,
X$^4$=silicon, aluminum, titanium and/or zirconium,
a=0.2 to 5,
b=0.01 to 5,
c=0 to 10,
d=0 to 2,
e=0 to 8,
f=0 to 10, and
n=a number which is determined by the valency and frequency of the elements in I other than oxygen.

Descriptions of the preparation of corresponding unsupported catalyst rings and coated catalyst rings can be found, for example, in US 2005/0263926, in WO 02/30569, in WO 2005/030393, in Research Disclosure RD 2005/497012, in DE-A 10 2007 005 602 and in DE-A 10 2007 004 961. In the aforementioned documents, such annular catalysts are recommended especially for a heterogeneously catalyzed partial oxidation of propylene to acrolein or acrolein and acrylic acid, and of isobutene to methacrolein.

With regard to the ring geometry to be used, what has already been stated to be generally valid in this document applies. A ring geometry for multimetal oxide (I) shaped unsupported catalyst bodies which is particularly relevant for the process according to the invention is, for example, the geometry E×I×H=5 mm×2 mm×3 mm. Other favorable multimetal oxide (I) unsupported catalyst ring geometries E×I×H are the geometries 5 mm×2 mm×2 mm, or 5 mm×3 mm×3 mm, or 5.5 mm×3.5 mm×3 mm, or 6 mm×4 mm×3 mm, or 6.5 mm×4.5 mm×3 mm, or 7 mm×5 mm×3 mm, or 7 mm×3 mm×7 mm, or 7 mm×4 mm×7 mm.

With regard to the active compositions of the stoichiometry of the general formula I, the stoichiometric coefficient b is preferably from 2 to 4, the stoichiometric coefficient c is preferably from 3 to 10, the stoichiometric coefficient d is preferably from 0.02 to 2, the stoichiometric coefficient e is preferably from 0 to 5 and the stoichiometric coefficient f is advantageously from 0.5 or 1 to 10. More preferably, the aforementioned stoichiometric coefficients are simultaneously within the aforementioned preferred ranges.

Moreover, X$^1$ is preferably cobalt, X$^2$ is preferably K, Cs and/or Sr, more preferably K, X$^3$ is preferably tungsten, zinc and/or phosphorus and X$^4$ is preferably Si. More preferably, the variables X$^1$ to X$^4$ are simultaneously as defined above.

All statements made in this document apply especially with regard to performance of the heterogeneously catalyzed partial gas phase reaction in a tube bundle reactor.

Tube bundle reactors suitable in a favorable manner for the performance of heterogeneously catalyzed partial gas phase oxidations are sufficiently well known from the prior art (cf., for example, DE-A 44 31 949, EP-A 700 714).

In these reactions, as already mentioned, the reaction gas mixture is normally conducted through the fixed catalyst bed disposed in the catalyst tubes (reaction tubes) of the tube bundle reactor, and the reactants are converted during the residence time of the reactants over the catalyst surface.

The reaction temperature in the catalyst tubes is controlled, inter alia, by conducting a fluid heat carrier (a heat exchange medium) around the catalyst tubes of the tube bundle which are accommodated in a vessel in order to remove energy from the reaction system. Heat carrier and reaction gas mixture can be conducted through the tube bundle reactor either in cocurrent or in counter current.

In addition to the possibility of conducting the heat exchange medium in a simple manner essentially immediately longitudinally to the catalyst tubes, this longitudinal conduction can also be realized merely over the entire reaction vessel and the transverse flow can be superimposed on this longitudinal flow within the reaction vessel through an arrangement, in succession along the catalyst tubes, of deflecting disks which leave passage cross sections free, so as to result in a meandering flow profile of the heat exchange medium through the tube bundle in longitudinal section (cf., for example, DE-A 44 31 949, EP-A 700 714, DE-C 28 30 765, DE-A 22 01 528, DE-A 22 31 557 and DE-A 23 10 517).

If required, essentially spatially separate heat carriers can be conducted around the catalyst tubes along different tube sections.

The tube section over which the particular heat carrier extends typically represents a single reaction zone. A variant of such multizone tube bundle reactors used with preference is the two-zone tube bundle reactor, as described, for example, by the documents DE-C 28 30 765, DE-C 25 13 405, U.S. Pat. No. 3,147,084, DE-A 22 01 528, EP-A 383224 and DE-A 29 03 582.

Suitable heat exchange media are, for example, melts of salts such as potassium nitrate, potassium nitrite, sodium nitrite and/or sodium nitrate, low-melting metals such as sodium, mercury and alloys of different metals, ionic liquids (in which at least one of the oppositely charged ions comprises at least one carbon atom), but also conventional liquids, for example water or high-boiling organic solvents (for example mixtures of Diphyl® and dimethyl phthalate).

Typically, the catalyst tubes are manufactured from ferritic steel or from stainless steel and frequently have a wall thickness of a few mm, for example from 1 to 3 mm. Their internal diameter is usually a few cm, for example from 10 to 50 mm, frequently from 20 to 30 mm. The tube length normally extends to a few meters (a typical catalyst tube length is in the range from 1 to 8 m, frequently from 2 to 6 m, in many cases from 2 to 4 m). Appropriately from an application point of view, the number of catalyst tubes (working tubes) accommodated in the vessel is at least 1000, frequently at least 3000 or 5000 and in many cases at least 10 000. Frequently, the number of catalyst tubes accommodated in the reaction vessel is from 15 000 to 30 000 or 40 000 or 50 000. Tube bundle reactors having a number of catalyst tubes above 50 000 are usually the exception. Within the vessel, the catalyst tubes are normally arranged essentially in homogeneous distribution, the distribution appropriately being selected such that the distance of central internal axes of immediately adjacent catalyst tubes (the so-called catalyst tube pitch) is from 25 to 55 mm, frequently from 35 to 45 mm (cf., for example, EP-A 468 290).

Normally, in each case at least some of the catalyst tubes (working tubes) of a tube bundle reactor, appropriately from an application point of view their entirety, are manufactured in a uniform manner within the capability of the manufacturing means. In other words, their internal diameter, their wall thickness and their tube length are identical within narrow tolerances (cf. WO 03/059857).

The aforementioned profile of requirements frequently also relates to the filling of such uniformly manufactured catalyst tubes with shaped catalyst bodies (cf., for example, WO 03/057653), in order to ensure optimal and substantially trouble-free operation of the tube bundle reactor. Especially for an optimal yield and selectivity of the reactions performed in the tube bundle reactor, it is essential that preferably all working tubes of the reactor are filled, i.e. charged, with the fixed catalyst bed in a very uniform manner. Especially against this background, particular significance accrues to the present invention.

Working tubes are typically distinguished from thermal tubes as described, for example, by EP-A 873 783. While the working tubes are those catalyst tubes in which the chemical reaction to be performed is performed in the actual sense, thermal tubes serve the purpose primarily of monitoring and of controlling the reaction temperature in the catalyst tubes. For this purpose, the thermal tubes, normally in addition to the fixed catalyst bed, comprise a thermowell which is conducted along the center of the thermal tube and is charged merely with a temperature sensor. In general, the number of thermal tubes in a tube bundle reactor is very much smaller than the number of working tubes. Normally, the number of thermal tubes is $\leq 20$. Since the thermowell present in thermal tubes influences the packing density of the fixed catalyst bed, the fixed catalyst bed in the thermal tube is, if appropriate, configured appropriately to the aim in the process according to the invention by using material which falls through the screen (on this subject, see, for example, EP-A 873 783 and EP-A 1 270 065).

The fixed catalyst bed does not consist of a bed of a single type of annular geometric shaped catalyst bodies which is uniform along the individual catalyst tube in all heterogeneously catalyzed partial gas phase oxidations over the fixed catalyst bed disposed in the tubes of tube bundle reactors. Instead, the fixed catalyst bed, over the total length of the catalyst tube, can also consist of a homogenized mixture of a plurality of (i.e. at least two) mutually distinguishable types $S^i$ of geometric shaped catalyst bodies or of geometric shaped catalyst bodies and geometric shaped inert bodies (i.e. such a mixture may consist of at least two mutually distinguishable types of geometric shaped catalyst bodies, or of a single type of geometric shaped catalyst bodies and of a single type of geometric shaped inert bodies, or of at least two types of mutually distinguishable geometric shaped catalyst bodies and a single type of geometric shaped inert bodies, or of at least two types of mutually distinguishable geometric shaped catalyst bodies and at least two types of mutually distinguishable geometric shaped inert bodies). Among these different types $S^i$, it is possible if appropriate for only one type of inventive annular shaped catalyst bodies K to be present. Possible distinguishing features of the different types $S^i$ are the type of geometry, the type of active composition, the type of support material, etc. Useful materials for the geometric shaped inert bodies include the same materials as have already been recommended for the inert geometric shaped support bodies for the coated catalysts and essentially do not intervene in the course of the gas phase partial oxidation. In principle, all inert shaped support bodies are also useful as geometric shaped inert bodies for diluting geometric shaped catalyst bodies in a fixed catalyst bed. Such a dilution allows the volume-specific activity of a fixed catalyst bed to be adjusted specifically to the requirement of the particular heterogeneously catalyzed partial gas phase oxidation.

Geometric shaped inert bodies and geometric shaped catalyst bodies in a homogenized mixture corresponding to the above preferably have the same geometry or at least a similar geometry.

The wording "homogenized mixture" means that measures have been taken in order to mix the different types of geometric shaped bodies (or the different longitudinal dimensions within one type) homogeneously with one another. In the ideal case, the homogeneous mixing along the entire longitudinal section attains the statistical average, also with regard to the particular individual type.

In many cases, a catalyst tube charge (a catalyst tube filling) with one fixed catalyst bed, however, also consists of a plurality of mutually distinguishable longitudinal sections installed alongside one another (in succession) (fixed catalyst bed (longitudinal) sections, catalyst bed sections). In this case, each individual longitudinal section may be configured uniformly over its length, as has already been detailed for a catalyst tube charged uniformly over its total catalyst tube length. At the transition from one intrinsically homogeneous bed section to the next intrinsically homogeneous bed section, the configuration (composition) of the bed changes abruptly. Along an individual catalyst tube, this gives rise to fixed catalyst beds which have a heterogeneous structure.

Reference is also made to a structured filling (or bed) of the catalyst tubes. At the start (viewed in flow direction of the reaction gas flowing through the catalyst tube) and/or at the end of the catalyst tube, the fixed catalyst bed is frequently concluded by a sole bed of geometric shaped inert bodies.

Examples of such structured fillings of catalyst tubes are described, inter alia, in documents US 2006/0161019, EP-A 979 813, EP-A 090 744, EP-A 456 837, EP-A 1 106 598, U.S. Pat. No. 5,198,581 and U.S. Pat. No. 4,203,903.

In general, the filling of a catalyst tube with a structured fixed catalyst bed will be configured such that the volume-specific activity of the fixed catalyst bed increases in flow direction of the fixed catalyst bed. The volume-specific activity of an intrinsically homogeneous longitudinal section of a fixed catalyst bed charge of a catalyst tube is increased when, with continuous charging of the catalyst tube as in the corresponding longitudinal section of the catalyst tube, under otherwise identical reaction conditions (i.e. identical composition of the reaction gas mixture, identical loading of the fixed catalyst bed charge with reaction gas mixture and identical entrance temperature of the heat carrier and identical flow conditions of the heat carrier), an increased reactant conversion (based on single pass of the reaction gas mixture through the catalyst tube) results.

The loading of a fixed catalyst bed which catalyzes a reaction step with reaction gas or with a reaction gas component is understood to mean the amount of reaction gas or reaction gas component in standard liters (l (STP); the volume in liters that the corresponding amount of reaction gas or reaction gas component would take up under standard conditions, i.e. at 25° C. and 1 bar) which is conducted through one liter of fixed catalyst bed per hour. Pure inert material bed sections are not included.

For the preparation of multielement oxide shaped unsupported catalyst bodies K, the procedure will, as already stated, advantageously quite generally be to shape a finely divided mixture of precursor compounds, which generally comprises graphite as an added finely divided shaping assistant, to the desired annular geometry of the shaped catalyst body K and to treat the resulting annular shaped catalyst precursor bodies (they are also referred to quite generally as "annular green bodies") at elevated temperature to obtain the screening material which is composed of annular shaped catalyst bodies K and fragments of shaped catalyst bodies K (whose active composition is the desired multielement oxide) and is to be treated in accordance with the invention.

Specifically, the procedure may, for example, be as described in the documents WO 2005/030393, DE-A 102007005606, DE-A 102007004961, EP-A 467144, EP-A 1060792, DE-A 19855913, WO 01/68245, EP-A 1060792, Research Disclosure RD 2005-497012, WO 03/078310, DE-A 102005035978, DE-A 102005037678, WO 03/78059, WO 03/078310, DE-A 19922113, WO 02/24620, WO 02/062737 and US-A 2005/0131253. The process according to the invention is recommended not least in the case of side crushing strengths of the annular green bodies of $\leq 20$ N.

Advantageously, the annular green bodies will actually also be subjected to a screening process according to the invention. It will be appreciated that the annular green bodies can, though, also be subjected to a screening process according to U.S. Pat. No. 7,147,011 or EP-A 1726358. The screen residue which remains is largely free of fragments of annular green bodies and is subsequently treated thermally to obtain the annular multielement oxide shaped unsupported catalyst bodies K. In a very particularly advantageous manner, such a thermal treatment will be performed on a belt calciner, as described by way of example by WO 02/24620 and WO 03/078310.

Appropriately from an application point of view, a cooling zone is disposed at the end of the belt calciner, at which the calcined material is cooled to a temperature appropriate from an application point of view for the inventive screening (for example from 40 to 100° C., usually from 60 to 80° C.). The conveyor belt of the belt calciner feeds the cooled calcined material advantageously through a soft (thermally stable) plastic hose (for example of PVC (wall thickness: typically 3 mm)) as adjoining member and, following gravity, continuously to the screening plane of the screening machine used (preferably a planar screening machine or a planar vibrating screening machine). The fall height may, for example, be from 30 to 100 cm, frequently from 40 to 70 cm. In order to prevent the formation of additional fractured annular shaped catalyst bodies K over this fall height, the connecting hose is advantageously configured in zig-zag form, as shown by FIG. 12. Typically, the internal diameter of such a connecting hose, based on a production stream of from 30 kg/h to 70 kg/h of annular shaped catalyst bodies K per hour, is about 20 cm. The inventive screening can be performed continuously connected seamlessly to the thermal treatment in this way, just like the thermal treatment. The screening itself is advantageously performed under air (especially in the case of all multielement oxide catalysts listed by way of example in this document). The residence time of the material being screened in the screening machine is typically from 0.05 to 0.6 h, frequently from 0.1 to 0.3 h. In the case of highly hygroscopic or oxygen-sensitive catalysts or active compositions, the screening can also be effected with exclusion of moisture and/or oxygen (for example under $N_2$). From the screening machine, the annular shaped catalyst bodies K are generally fed directly to a vessel closable in an air-tight manner, in which they are stored. From this vessel (for example a vat lined with a polypropylene shell), they can then be withdrawn, for example, for the purpose of a structured filling of reaction tubes (catalyst tubes) following the teaching of DE-A 102004023249. On the route from the storage vat into the package recommended in DE-A 102004023249, it is advantageously possible once again to undertake an inventive screening. When the thermal treatment of the annular green bodies in the belt calciner is not performed under air, but rather, for example, under $N_2$ and/or $H_2O$, belt calciner and screening machine are, appropriately from an application point of view, separated by a star feeder which prevents excessively large amounts of $N_2$ and/or $H_2O$ from the belt calciner being discharged on the route of the calcination material (screening material) to the inventive screening.

A suitable screening machine for the inventive screening is particularly advantageously a free vibrator of the E. A. 36-3 type from Engelsmann AG, DE-67059 Ludwigshafen (screen area: approx. $0.375 \, m^2$, screen inclination: 3-4°, DIN material 1.4541, three screen inserts arranged in series in conveying direction (the first two are identical undersize screen inserts, the third screen insert is intended for removing oversize) of in each case 500 mm×250 mm×25 mm with 20 rubber balls in each case (diameter: 20 mm, type: 2610-2-60 as screening aids)).

Following the recommendations of this application, the screen plates used are directed to the geometry of the screening material (of the annular shaped catalyst bodies K).

The inventive procedures described are of course also suitable when the active composition of the annular shaped catalyst bodies is a multielement oxide of the general formula II $$Mo_{12}P_aV_bX_c^1X_d^2X_e^3Sb_fRe_gS_hO_n \quad (II)$$

where
X¹=potassium, rubidium and/or cesium,
X²=copper and/or silver,
X³=cerium, boron, zirconium, manganese and/or bismuth,
a=0.5 to 3,
b=0.01 to 3,
c=0.2 to 3,
d=0 to or 0.01 to 2,
e=0 to 2,
f=0 to or 0.01 to 2,
g=0 to 1,
h=0 to or 0.001 to 0.5, and
n=a number which is determined by the valency and frequency of the elements in II other than oxygen.

Such annular shaped catalyst bodies are advantageously suitable especially for a heterogeneously catalyzed partial gas phase oxidation of methacrolein to methacrylic acid. Possible ring geometries include all of those mentioned in general in this document.

Annular shaped unsupported catalyst bodies K composed of multielement oxides II are preferably obtainable, for example, by the procedure described in EP-A 467 144. A preferred ring geometry is that where E×I×H=7 mm×3 mm×6.9 mm (see also DE-A 102007005602). Otherwise, the partial oxidation process conditions described in EP-A 467 144 and DE-A 102007005602 may be employed.

The process according to the invention is also suitable for annular shaped catalyst bodies K whose active composition is a multielement oxide active composition of the general formula III $$V_1P_bFe_cX_d^1X_e^2O_n \quad (III),$$

in which the variables are each as defined follows:
X¹=Mo, Bi, Co, Ni, Si, Zn, Hf, Zr, Ti, Cr, Mn, Cu, B, Sn and/or Nb,
X²=K, Na, Rb, Cs and/or Tl,
b=0.9 to 1.5,
c=0 to 0.1,
d=0 to 0.1,
e=0 to 0.1 and
n=a number which is determined by the valency and frequency of the elements in III other than oxygen.

Such catalysts are suitable especially for the heterogeneously catalyzed partial gas phase oxidation of hydrocarbons having at least four carbon atoms (especially n-butane, n-butenes and/or benzene) to maleic anhydride. Possible ring geometries include all of those mentioned in general in this document.

Advantageously, these annular shaped catalyst bodies are likewise annular unsupported catalysts, as obtainable, for example, according to WO 03/078310, WO 01/68245, DE-A 102005035978 and DE-A 102007005602.

Favorable ring geometries are, for example, E×I×H=6.6 mm×3.7 mm×4.2 mm or 5 mm×2.5 mm×3.2 mm.

Otherwise, the partial oxidation process conditions recommended in WO 03/078310, WO 01/68245, DE-A 102005035978 and DE-A 102007005602 can be employed.

The inventive procedure is also advantageously suitable for annular shaped catalyst bodies K whose active composition is a multielement oxide composition of the general formula IV $$Mo_{12}V_aX_b^1X_c^2X_d^3X_e^4X_f^5X_g^6O_n \quad (IV)$$

where
X¹=W, Nb, Ta, Cr and/or Ce,
X²=Cu, Ni, Co, Fe, Mn and/or Zn,
X³=Sb and/or Bi,
X⁴=one or more alkali metals (Li, Na, K, Rb Cs) and/or H,
X⁵=one or more alkaline earth metals (Mg, Ca, Sr, Ba),
X⁶=Si, Al, Ti and/or Zr,
a=1 to 6,
b=0.2 to 4,
c=0 to 18, preferably 0.5 to 18,
d=0 to 40,
e=0 to 2,
f=0 to 4,
g=0 to 40, and
n=a number which is determined by the valency and frequency of the elements in IV other than oxygen.

They are suitable in particular for a heterogeneously catalyzed partial gas phase oxidation of acrolein to acrylic acid.

Possible ring geometries include all of those mentioned in general in this document. The annular shaped catalyst bodies K here are advantageously coated catalysts as obtainable, for example, according to DE-A 102004025445, DE-A 10350822, DE-A 102007010422, US 2006/0205978 and EP-A 714700, and the prior art cited in these documents. The active composition coating thickness may be from 10 to 1000 μm, preferably from 50 to 500 μm and more preferably from 150 to 250 μm. Favorable coating thicknesses are those of the exemplary embodiments of EP-A 714700. The aforementioned document also describes the partial oxidation conditions by way of example. A preferred ring geometry is that where E×I×H=7 mm×4 mm×3 mm.

A multielement oxide comprising V and Ti (especially one according to the documents U.S. Pat. No. 6,528,683 or U.S. Pat. No. 6,586,361 or U.S. Pat. No. 6,362,345) is suitable especially for a heterogeneously catalyzed partial oxidation of o-xylene and/or naphthalene to phthalic anhydride.

Preference is given to using the aforementioned multielement oxides as annular coated catalysts. Examples of ring geometries include the ring geometries E×I×H=8 mm×5 mm×6 mm, or 8 mm×4 mm×6 mm, or 8 mm×3 mm×6 mm and 7 mm×4 mm×7 mm.

Annular shaped catalyst bodies whose active composition comprises elemental silver on an oxidic support body are suitable (in particular as supported catalysts) especially for a heterogeneously catalyzed partial gas phase oxidation of ethylene to ethylene oxide (cf. EP-A 496470). Useful shaped support bodies are in particular those which consist to an extent of at least 80% by weight of aluminum oxide (e.g. Al₂O₃). Supported catalysts which comprise elemental silver in their active composition applied on an oxidic support body and are suitable for a heterogeneously catalyzed partial gas phase oxidation of ethylene to ethylene oxide are, though, also the annular supported catalysts of EP-A 619 142, EP-A 624 398, EP-A 804 289 and EP-A 937 498. For all aforementioned supported catalysts, the process according to the invention is suitable. Suitable ring geometries E×I×H include the ring geometries 8.5 mm×3.2 mm×8.5 mm, and 8.5 mm×3.4 mm×8.5 mm and 8 mm×3 mm×8 mm or 7.7 mm×3 mm×5 mm.

Generally, the process according to the invention is favorable not least in the case of annular shaped catalyst bodies K (especially in the case of unsupported multielement oxide catalysts) whose side crushing strength is ≦20 N (generally ≧1 N). Frequently, the aforementioned side crushing strength is ≧5 N and ≦15 N.

In this document, the side crushing strength is understood to mean the crushing strength when the annular shaped catalyst body K (or the annular green body or annular shaped precursor catalyst bodies) is compressed at right angles to the cylindrical shell (i.e. parallel to the area of the ring orifice).

All side crushing strengths in this document relate to a determination by means of a Z 2.5/TS 15 materials testing machine from Zwick GmbH & Co (D-89079 Ulm). This materials testing machine is designed for quasistatic stress having a single-impetus, stationary, dynamic or varying profile. It is suitable for tensile, compressive and bending tests.

The installed KAF-TC force transducer from A.S.T. (D-01307 Dresden) with the manufacturer number 03-2038 is calibrated in accordance with DIN EN ISO 7500-1 and was usable for the 1-500 N measurement range (relative measurement uncertainty: ±0.2%).

Measurements of side crushing strengths are preferably performed with the following parameters:
Initial force=0.5 N.
Rate of initial force=10 mm/min.
Testing rate=1.6 mm/min.

In the test, the upper die was initially lowered slowly down to just above the surface of the cylindrical shell of the annular shaped body. The upper die was then stopped in order subsequently to be lowered at the significantly lower testing rate with the minimum initial force required for further lowering. The initial force at which the annular shaped body shows crack formation is the side crushing strength (SCS).

EXAMPLES AND COMPARATIVE EXAMPLES

I. As described in Research Disclosure RD 2005-497012 in Example I., B), VVK3, annular shaped unsupported multielement oxide bodies of geometry E×I×H=5 mm×2 mm×3 mm with the element stoichiometry $Mo_{12}Bi_1W_2Co_{5.5}Fe_{2.94}Si_{1.59}K_{0.08}O_x$ were prepared. The green bodies were treated thermally as specified in RD 2005-497012 in a belt calciner according to DE-A 10048957. After the calcined material had been cooled to a temperature of 60° C. in a cooling zone integrated into the belt calciner, it was fed continuously through a PVC hose in a zig-zag configuration according to FIG. 12 (the numerical references in FIG. 12 are angles or mm) to a planar vibrating screening machine "Free vibrator of the E.A. 36-3 type from Engelsmann AG, DE-67059 Ludwigshafen (screen area: approx. 0.375 m²; screen inclination: 3-4°, DIN material 1.4541, three screen inserts arranged in succession in conveying direction (the first two were identical undersize screen inserts; the third screen insert brought about oversize removal) of in each case 500 mm×250 mm×25 mm with in each case 20 rubber balls (diameter: 20 mm, type: 2610-2-60 as screening aids))", and subjected to a continuous high-frequency (approx. 15 Hz) screening with a short stroke (approx. 15 mm).

The screen plates used were slotted sheet screens with rectangular screen orifices (or outlines thereof) in offset rows analogously to FIG. 8. The screen residue of the first two screen inserts in conveying direction, which had been freed of oversize, was subsequently used in each case to fill a reaction tube (internal diameter 25 mm, length 2.7 m). 2511 l (STP)/h of $N_2$ flowed through the charged reaction tube (the reaction tube was open in flow direction against 1.017 bar at 20.5° C.) and the pressure drop Δp (mbar) which resulted in each case was determined. The reaction tube charge consisted, in flow direction, in each case first for a length of 1.0 m of a homogenized mixture of 30% by weight of undamaged steatite rings of the same geometry and 70% by weight of material which passed through the screen in the oversize removal, and thereafter, for a length of 1.7 m, only of the aforementioned material which passed through the screen. The screen plate thickness was 1 mm.

The residence time of the screening material on one of the screen inserts was an average of about 10 minutes.

Table 1 below shows the results obtained as a function of the screen orifice parameters C and L of the two undersize screen inserts according to FIG. 2.

The quotient $m_U/m_{tot}$ gives the proportion by weight of the undersize fraction removed in the screening in % by weight and based on the total amount of screening material introduced. E represents inventive example; C represents comparative example. In addition, Table 1 comprises the result in the case of unscreened calcination product for reaction tube charging.

TABLE 1

|  | C (mm) | L (mm) | $m_U/m_{tot}$ (% by wt.) | Δp (mbar) |
|---|---|---|---|---|
| E1 | 1.8 | 20 | 0.53 | 258 |
| C1 (E > C > H and L = C) | 4.5 | 4.5 | 1.05 | 267 |
| C2 (E > C > H and L > C) | 4.5 | 6.0 | 25.9 | 245 |
| C3 (C < (E − I/2)) | 1.0 | 20 | 0.28 | 289 |
| C4 (unscreened) | — | — | 0 | 301 |

E1 achieved the second-best result for Δp with comparatively low $m_U/m_{tot}$.

In the case of the oversize screen insert used, C was 6 mm and L was 14 mm.

A detailed analysis of the results found gave rise to the following reasons with reference to FIGS. 13 to 16.

Figure 13:
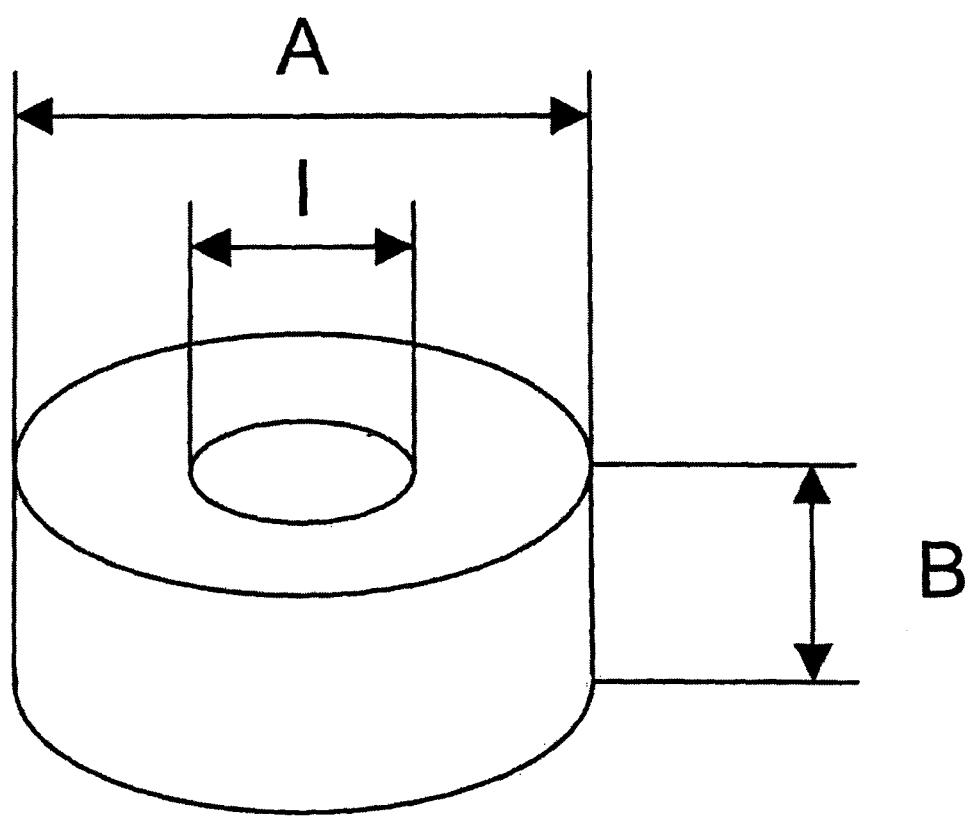
Figure 14:
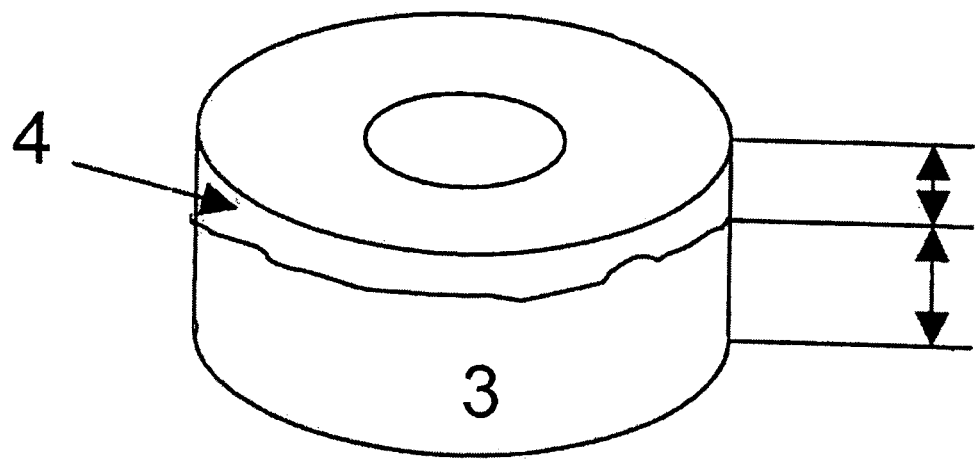
Figure 15:
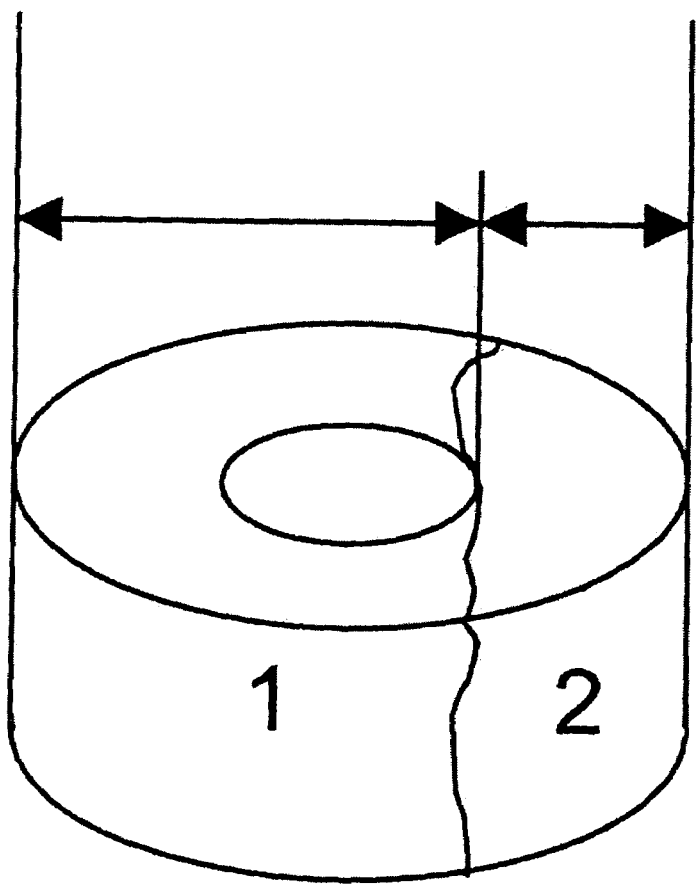
Figure 16:
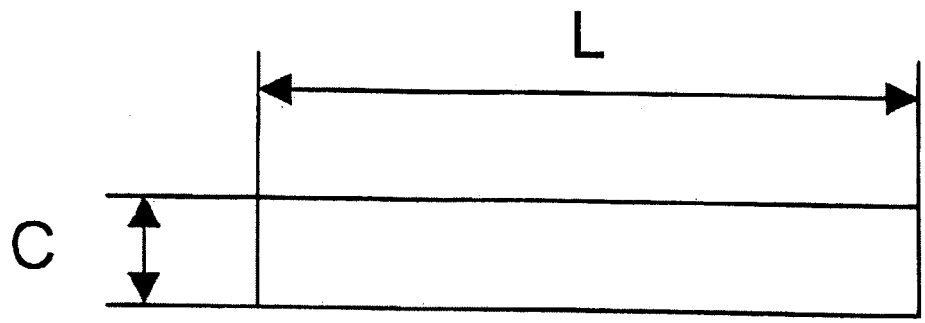

FIG. 13 shows a schematic of an undamaged annular shaped catalyst body. FIGS. 14 and 15 show schematics of fracture lines which occur therein with elevated frequency in the preparation of the annular shaped catalyst bodies, and also fragments 1 and 2, and 3 and 4, which result in the case of fracture. FIG. 16 shows a schematic of a screen orifice (or outline thereof) from the top.

In E1, in the fine particle screening, the fine fragments 2 and 4 were part of the material passing through the screen and the coarse fragments 1 and 3 were in the screen residue.

In C1, in the fine particle screening, fragments 1 and 2 were part of the material passing through the screen, and fragments 3 and 4 were in the screen residue.

In C2, in the fine particle screening, fragments 2 and 4 and also 1 and 3 and even whole rings were part of the material passing through the screen.

In the case of an increase in the residence time of the screening material on the fine particle screen inserts, the proportion of whole rings in the material passing through the screen increased significantly.

In C3, in the fine particle screening, as well as dust, essentially only fragments 4 were in the material passing through the screen, but fragments 1, 2 and 3 were in the screen residue.

Working Example E1 can be performed in a completely corresponding manner when the slotted sheet screens with rectangular screen orifices in the screen inserts are replaced by those with elongated hole orifices according to FIG. 8. In this case, the two undersize screen inserts may have the following configuration of the slotted sheet screen:

C=1.8 mm; L=18.8 mm; a=3.4 mm; b=3 mm; d=1 mm; F=23.4%.

The oversize screen insert may have the following configuration of the slotted sheet screen:

C=5.7 mm; L=14 mm; a=5.9 mm; b=5.4 mm; d=1 mm; F=38.7%.

Both in the case of the undersize screen inserts and in the case of the oversize screen insert, DIN material (steel) 1.4541 is the preferred material. As an alternative, DIN material 1.4571 is also suitable.

The blank tray is manufactured from the same material and has square 10 mm×10 mm screen orifices in a slotted sheet screen configuration (d=1 mm) with bridge widths of 2.9 mm on all sides of a screen orifice.

Figure 17:
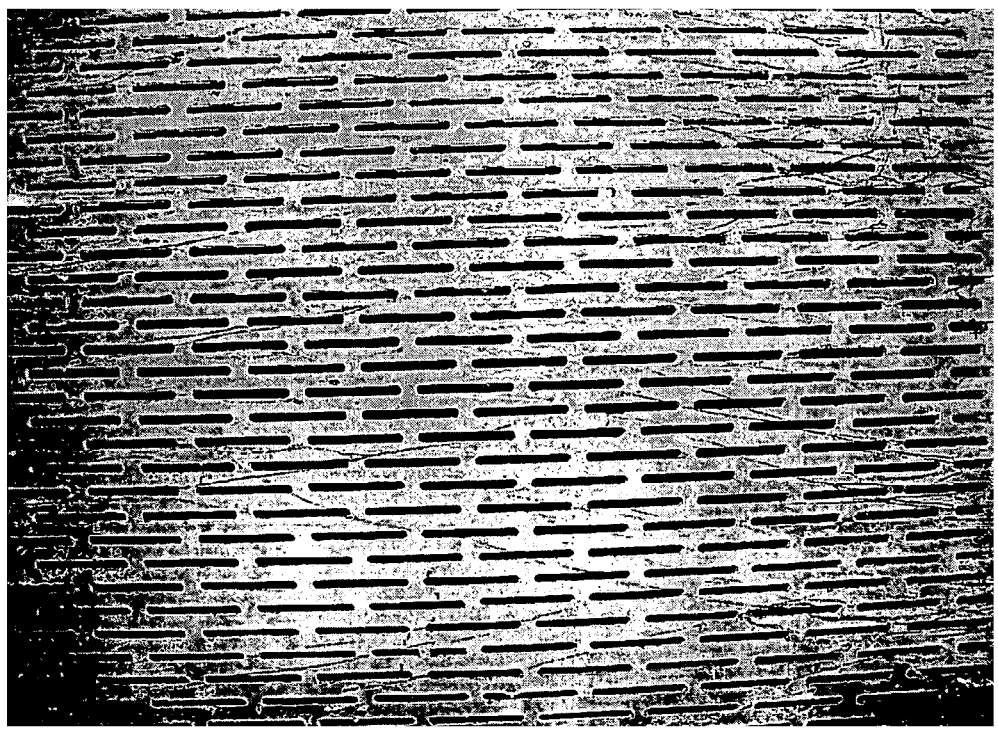
Figure 18:
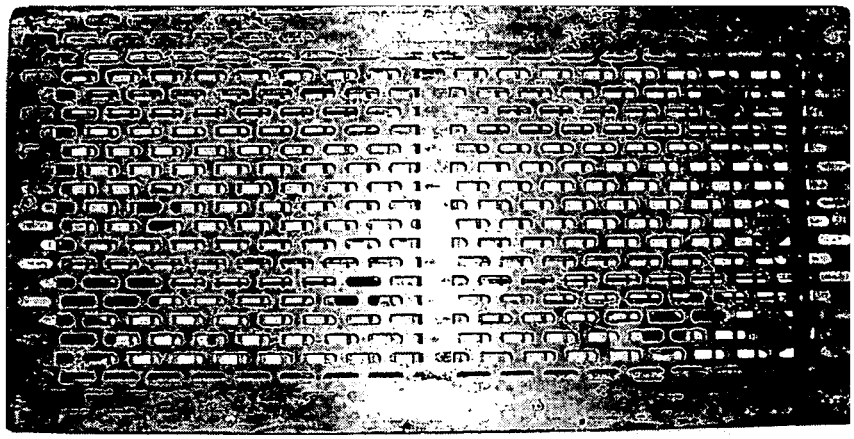

FIG. 17 shows a section of such an undersize screen insert from the top. FIG. 18 shows a section of such an oversize screen insert from the top.

II. As described in Research Disclosure RD 2005-497012 in Example III., A, annular shaped unsupported catalyst multielement oxide bodies were prepared, except with the geometry E×I×H=7 mm×3 mm×6.9 mm. The element stoichiometry was $Mo_{12}P_{1.5}V_{0.6}Cs_{1.0}Cu_{0.5}Sb_1S_{0.04}O_x$. As specified in RD 2005-497012, the green bodies were treated thermally in a belt calciner according to DE-A 10048957.

After the calcined material had been cooled to a temperature of 60° C. in a cooling zone integrated into the belt calciner, it was, as in I., fed to the screening described in I. Table 2 below shows the results achieved as a function of the screen orifice parameters C and L of the two undersize inserts according to FIG. 2. The reaction tube having an internal diameter of 25 mm and a length of 3.99 m was always charged only with the material passing through the screen in the oversize removal. The pressure drop was determined as in I., except with a nitrogen stream of only 1996 l (STP)/h.

TABLE 2

|  | C (mm) | L (mm) | $m_U/m_{tot}$ (% by wt.) | Δp (mbar) |
| --- | --- | --- | --- | --- |
| E2 | 6.0 | 20 | 17.6 | 95 |
| E3 | 4.0 | 20 | 12.3 | 99 |
| C5 (E > C > H and L = C) | 6.95 | 6.95 | 19.8 | 102 |
| C6 (E > C > H and L > C) | 6.95 | 13 | 38.7 | 92 |
| C7 (C < (E − I/2) | 1.5 | 20 | 10.3 | 113 |
| C8 (unscreened) | — | — | 0 | 119 |

E2 and E3 achieved the second- and third-best result respectively for Δp with comparatively low $m_U/m_{tot}$. The reasons for these results correspond to those for the results in I.

Working Example E2 can be performed in a completely corresponding manner when the slotted sheet screens with rectangular screen orifices in the screen inserts are replaced by those having elongated hole orifices according to FIG. 8.

The two undersize screen inserts may have the following configuration of the slotted sheet screen:

C=5.7 mm; L=14.0 mm; a=6.2 mm; b=5.4 mm; d=1 mm; F=38.7%.

The oversize screen insert may have the following configuration of the slotted sheet screen:

C=8.8 mm; L=16 mm; a=5.3 mm; b=5.1 mm; d=1 mm; F=49.3%.

Both in the case of the undersize screen inserts and in the case of the oversize screen insert, DIN material (steel) 1.4541 is the preferred material. As an alternative, DIN material 1.4571 is also suitable.

The blank tray is manufactured from the same material and has square 10 mm×10 mm screen orifices in a slotted sheet screen configuration (d=1 mm) with bridge widths of 2.9 mm on all sides of a screen orifice.

Figure 19:
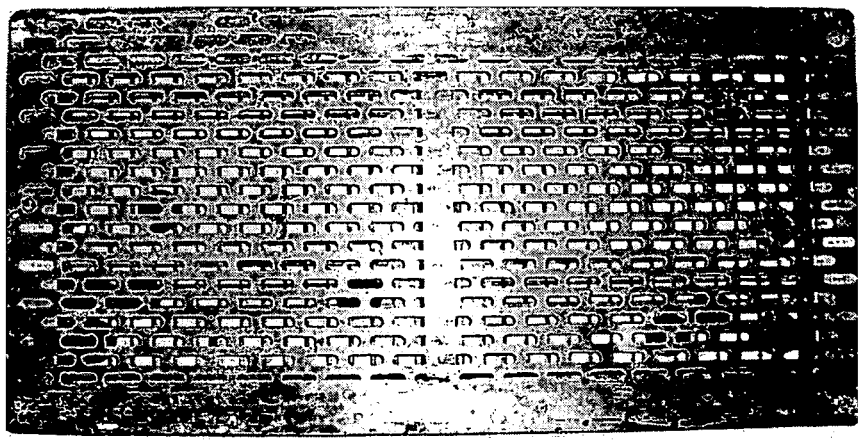
Figure 20:
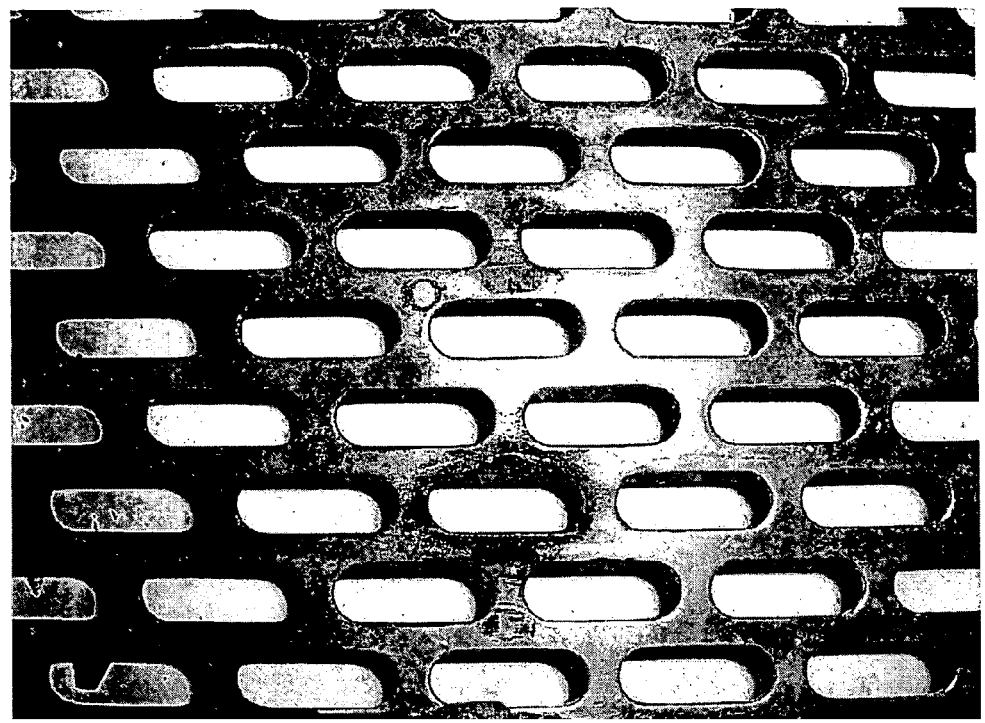

FIG. 19 shows a section of such an undersize screen insert from the top. FIG. 20 shows a section of such an oversize screen.

III. As described in Example 1 of WO 03/078310, an annular shaped unsupported catalyst body was prepared with the multielement oxide active composition comprising vanadium, phosphorus, iron and oxygen corresponding to that in the aforementioned Example 1, but with the ring geometry E×I×L=6.6 mm×3.7 mm×4.2 mm.

After the calcined material had been cooled to a temperature of 60° C. in a cooling zone integrated into the belt calciner, it was, as in I., fed to the screening described in I. Belt calciner and screening machine were separated by means of a star feeder, which prevented excessively great $H_2O/N_2$ amounts from being discharged by the belt calciner on the route of the calcination material to the screening. Table 3 below shows the results achieved as a function of the screen orifice parameters C and L of the two undersize inserts according to FIG. 2. The reaction tube having an internal diameter of 21 mm and a length of 6.00 m was always charged only with the material passing through the screen in the oversize removal. The pressure drop was determined as in I., but by means of an air stream of 4142 l (STP)/h.

TABLE 3

|  | C (mm) | L (mm) | $m_U/m_{tot}$ (% by wt.) | Δp (mbar) |
| --- | --- | --- | --- | --- |
| E4 | 3.5 | 20 | 0.66 | 544 |
| C9 (E > C > H and L = C) | 6.0 | 6.0 | 1.5 | 561 |
| C10 (E > C > H and L > C) | 6.0 | 12 | 31.4 | 522 |
| C11 (C < (E − I)/2) | 1.0 | 20 | 0.45 | 581 |
| C12 (unscreened) | — | — | 0 | 634 |

E4 achieved the second-best result for Δp with comparatively low $m_U/m_{tot}$. The reasons for these results correspond to those for the results in I.

Working Example E4 can be performed in a completely corresponding manner when the slotted sheet screens with rectangular screen orifices in the screen inserts are replaced by those with elongated hole orifices according to FIG. 8. The two undersize screen inserts may have the following configuration of the slotted sheet screen:

C=3.3 mm; L=16.3 mm; a=4.1 mm; b=5.6 mm; d=1 mm; F=32.3%.

The oversize screen insert may have the following configuration of the slotted sheet screen:

C=9.7 mm; L=16.3 mm; a=4.1 mm; b=5.6 mm; d=1 mm, F=42.0%.

Figure 21:
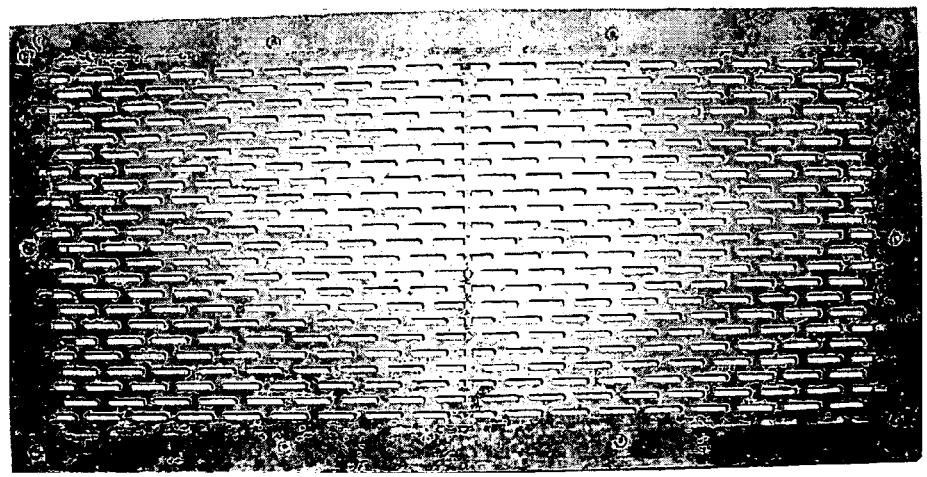

Both in the case of the undersize screen inserts and in the case of the oversize screen insert, DIN material (steel) 1.4541 is the preferred material. As an alternative, DIN material 1.4571 is also suitable. The blank tray is manufactured from the same material and has square 10 mm×10 mm screen orifices in a slotted sheet screen configuration (d=1 mm) with bridge widths of 2.9 mm on all sides of a screen orifice. FIG. 21 shows such an undersize screen insert from the top.

Figure 22:
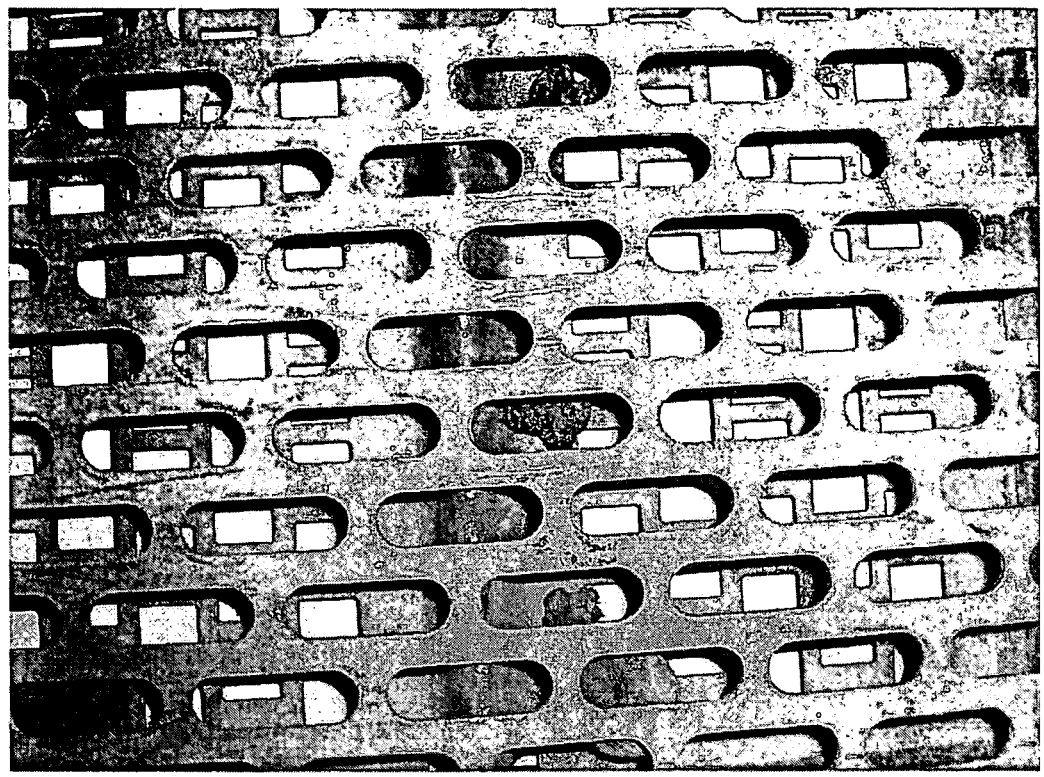

FIG. 22 shows a section of such an oversize screen insert.

Figure 23:
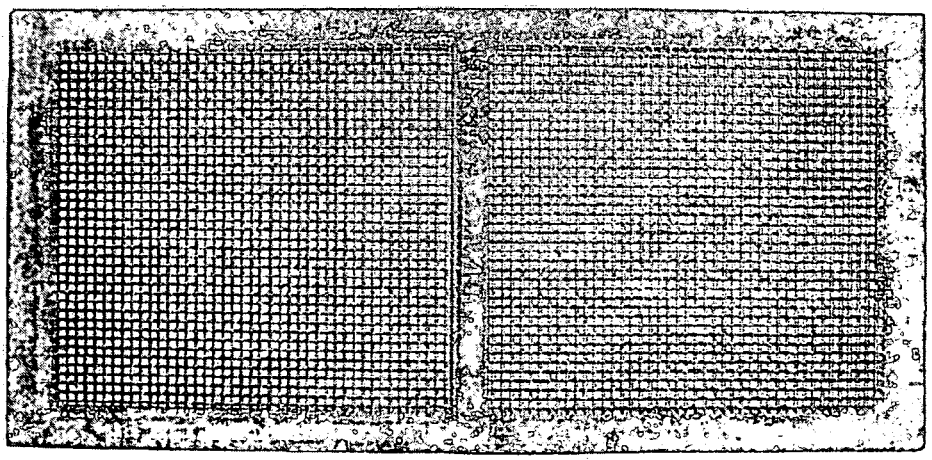
Figure 24:
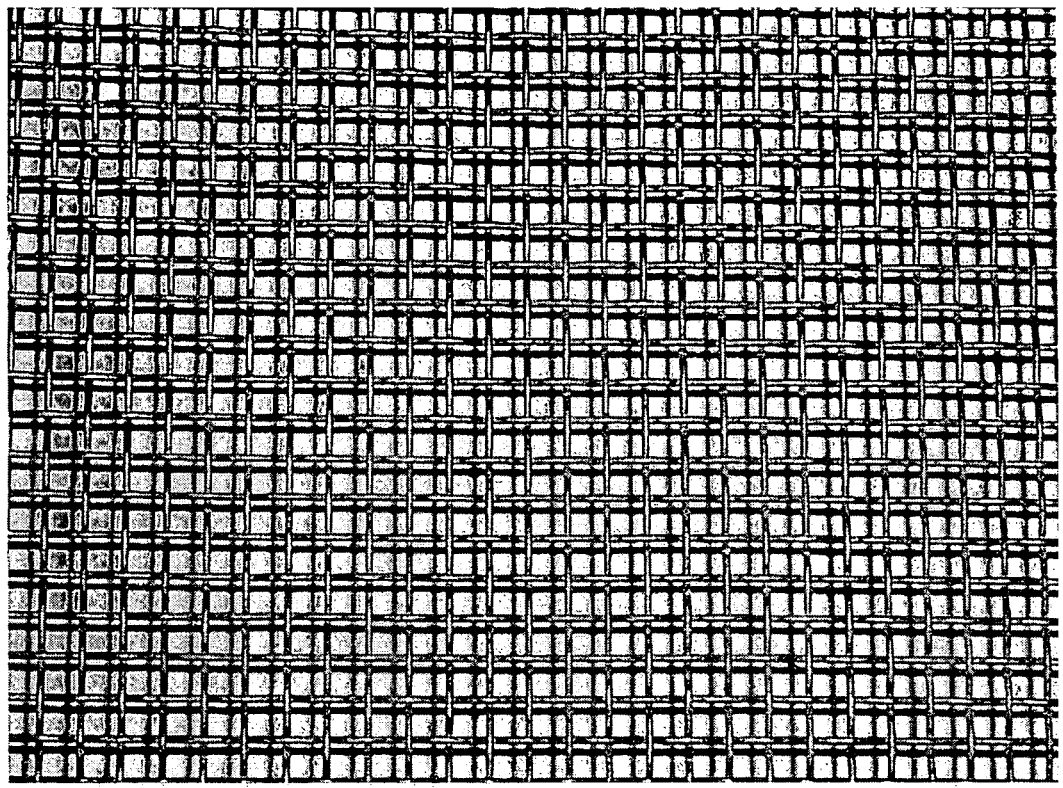
Figure 25:
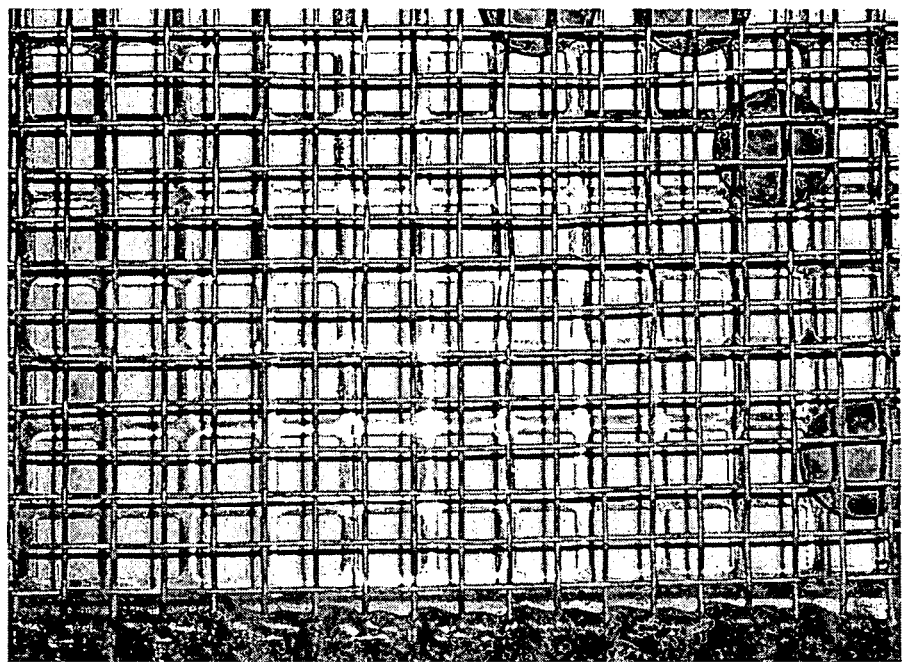

When the annular shaped unsupported catalyst body described in Example 1 of WO 03/078310 is prepared with the ring geometry E×I×H=5.5 mm×3 mm×3 mm, following the teaching of the prior art, a screen fabric according to FIG. 5, but with square screen orifices, will be used. For the undersize screen inserts, the square screen orifice may, for example, be 4 mm×4 mm (at a thickness of the woven wire of 0.95 mm). 360 screen orifices are then present on a total area of 100 cm$^2$. For the oversize screen insert, the square screen orifice may, for example, be 5.9 mm×5.9 mm (at a thickness of the woven wire of 1.0 mm). 182 screen orifices are then present on a total area of 100 cm$^2$. The woven wire may be manufactured either from DIN material 1.4541 or DIN material 1.4571. The blank tray can always be manufactured from the same material as a slotted sheet screen with square 10 mm×10 mm screen orifices (d=1 mm) and a bridge width of 2.9 mm on all sides of a screen orifice. FIG. 23 shows such an undersize screen insert according to the teaching of the prior art from the top. FIG. 24 shows a section of the accompanying screen. FIG. 25 shows a section of such an oversize screen insert according to the teaching of the prior art from the top.

However, such a procedure is associated with the disadvantages described in this document.

In other words, preference will be given in this case too to employing screens with inventive screen orifices (for example with corresponding rectangular or elongated hole orifices), for example that from E1, Table 1 of this document.

U.S. Provisional Patent Application No. 60/944,208, filed Jun. 15, 2007, is incorporated into the present patent application by literature reference. With regard to the abovementioned teachings, numerous changes and deviations from the present invention are possible. It can therefore be assumed that the invention, within the scope of the appended claims, can be performed differently from the way described specifically herein.

The invention claimed is:

1. A process for charging a reactor with a fixed catalyst bed which comprises at least one shaped catalyst body K whose geometric shape is that of a ring with the external diameter E, the internal diameter I and the height H where E≧H, which process comprises:
    contacting a screen with shaped catalyst bodies K and fragments thereof, wherein at least part of said fragments pass through the screen, thereby leaving a screen residue on the screen comprising the shaped catalyst bodies K, and
    charging the fixed catalyst bed with the screen residue,
    wherein the screen has screen orifices whose continuous outline has in each case at least two straight-line sections which are opposite one another at a distance C over at least one length L like two parallel sides of a rectangle with the side lengths L and C, with the proviso that each line which runs through an outline point P lying on the outline of a screen orifice and parallel to the theoretical rectangle side with the side length C does not have any further point lying on the outline whose distance from the outline point P is larger than the side length C,
    wherein, in the process for screening, the relations I, $$L>E\geqq H>C\geqq(E-I)/2 \qquad (I),$$

are satisfied.

2. The process according to claim 1, wherein, in the process for screening, the relations II, $$L>E\geqq H>C\geqq H/2(E-I)/2 \qquad (II),$$

are satisfied.

3. The process according to claim 1, wherein, in the process for screening, the relations VI, $$L>E\geqq H>0.9H\geqq C\geqq(E-I)/2 \qquad (VI),$$

are satisfied.

4. The process according to claim 1, wherein, in the process for screening, the relations III, $$L>E\geqq H>0.9H>C\geqq H/2(E-I)/2 \qquad (III),$$

are satisfied.

5. The process according to claim 1, wherein, in the process for screening, the relations V, $$L>E\geqq H>0.86H\geqq C\geqq H/2\geqq(E-I)/2 \qquad (V),$$

are satisfied.

6. The process according to claim 1, wherein L≧1.5·E.

7. The process according to claim 1, wherein L≧2·E.

8. The process according to claim 1, wherein L≧2.5·E.

9. The process according to claim 1, wherein L≦20·E.

10. The process according to claim 1, wherein the continuous outline of the screen orifices forms a rectangle with the side lengths L and C.

11. The process according to claim 1, wherein the continuous outline of the screen orifices forms an elongated hole which has the edge length L and the hole width C.

12. The process according to claim 1, wherein the screen used is a slotted sheet.

13. The process according to claim 1, wherein the screening is performed with a planar screen.

14. The process according to claim 1, wherein the screening is performed with a linear planar vibrating screen.

15. The process according to claim 1, wherein the reactor is a tube bundle reactor whose tubes are charged with the fixed catalyst bed.

16. The process according to claim 1, wherein E is from 2 to 10 mm and (E−I)/2 is from 1 to 3 mm.

17. The process according to claim 1, wherein the shaped catalyst bodies K are unsupported multielement oxide catalysts.

18. The process according to claim 1, which is followed by a process for heterogeneously catalyzed partial gas phase oxidation of an organic compound in the reactor charged with the fixed catalyst bed.

19. The process according to claim 18, wherein the heterogeneously catalyzed partial gas phase oxidation is a heterogeneously catalyzed partial gas phase oxidation of ethylene, of ethane, of methanol, of propylene, of propane, of acrolein, of methacrolein, of 1-butene, of 2-butene, of isobutene, of isobutane, of n-butane, of butadiene or of o-xylene.

20. The process according to claim 1, wherein the side crushing strength of the shaped catalyst bodies K is up to 20 N.

21. A process for at least partly removing fragments which have formed in the preparation of shaped catalyst bodies K whose geometric form is that of a ring with the external diameter E, the internal diameter I and the height H with the proviso that E≧H from a mixture of annular shaped catalyst bodies K which process comprises:
    contacting a screen with shaped catalyst bodies K and fragments thereof, wherein at least part of said fragments pass through the screen, thereby leaving a screen residue on the screen comprising the shaped catalyst bodies K,
    wherein the screen has screen orifices whose continuous outline has in each case at least two straight-line sections which are opposite one another at a distance C over at least one length L like two parallel sides of a rectangle with the side lengths L and C, with the proviso that each line which runs through an outline point P lying on the outline of a screen orifice and parallel to the theoretical rectangle side with the side length C does not have any further point lying on the outline whose distance from the outline point P is larger than the side length C, wherein, in the process for screening, the relations I, $$L > E \geq H > C \geq (E-I)/2 \qquad (I),$$

are satisfied.

* * * * *